(12) United States Patent
Al-Stouhi

(10) Patent No.: US 12,517,520 B2
(45) Date of Patent: Jan. 6, 2026

(54) SYSTEMS AND METHODS FOR COORDINATING TRAVEL OF GUIDANCE ROBOTS

(71) Applicant: Honda Motor Co., Ltd., Tokyo (JP)

(72) Inventor: Samir K. Al-Stouhi, Dearborn, MI (US)

(73) Assignee: HONDA MOTOR CO., LTD., Tokyo (JP)

(*) Notice: Subject to any disclaimer, the term of this patent is extended or adjusted under 35 U.S.C. 154(b) by 206 days.

(21) Appl. No.: 18/193,399

(22) Filed: Mar. 30, 2023

(65) Prior Publication Data

US 2024/0329642 A1 Oct. 3, 2024

(51) Int. Cl.
  *G05D 1/00* (2024.01)
  *B60W 30/16* (2020.01)
  *G08G 1/00* (2006.01)

(52) U.S. Cl.
  CPC ........... *G05D 1/0291* (2013.01); *B60W 30/16* (2013.01); *G05D 1/0223* (2013.01); *G08G 1/22* (2013.01); *B60W 2554/80* (2020.02)

(58) Field of Classification Search
  CPC ... G05D 1/0291; G05D 1/0223; B60W 30/16; B60W 2554/80; G08G 1/22
  See application file for complete search history.

(56) References Cited

U.S. PATENT DOCUMENTS

| | | | |
|---|---|---|---|
| 10,532,003 B2 | 1/2020 | Yu | |
| 10,545,509 B1 * | 1/2020 | Jessen | G05D 1/0291 |
| 10,649,467 B2 | 5/2020 | Sugiyama et al. | |
| 11,092,971 B2 | 8/2021 | Koo | |
| 11,161,250 B2 | 11/2021 | Yeom et al. | |
| 11,213,943 B2 | 1/2022 | Kim et al. | |
| 11,334,091 B2 | 5/2022 | Watabe et al. | |
| 11,467,592 B2 | 10/2022 | Hasegawa et al. | |
| 2021/0026371 A1 | 1/2021 | Sugiyama | |
| 2021/0065556 A1 * | 3/2021 | Aijaz | G05D 1/0295 |
| 2021/0154827 A1 | 5/2021 | Kim | |
| 2022/0063108 A1 | 3/2022 | Viilup | |

(Continued)

FOREIGN PATENT DOCUMENTS

| | | |
|---|---|---|
| CN | 108189041 A | 6/2018 |
| CN | 211061899 U | 7/2020 |

(Continued)

*Primary Examiner* — Dylan M Katz

(74) *Attorney, Agent, or Firm* — Armstrong Teasdale LLP

(57) ABSTRACT

A method for coordinating travel of guidance robots includes determining that at least a first guidance robot and a second guidance robot share a common route that is traveled by each of the first and second guidance robots while guiding a first user and a second user, respectively, towards a respective destination. The method also includes identifying a first user movement characteristic associated with the first user and a second user movement characteristic associated with the second user. The method also includes determining, based on the first and second user movement characteristics, a formation in which the first and second guidance robots are to be arranged while travelling along the common route. The method also includes causing the first and second guidance robots to be arranged in the determined formation while travelling along the common route.

20 Claims, 14 Drawing Sheets

(56) References Cited

U.S. PATENT DOCUMENTS

2022/0066438 A1\* 3/2022 Higashi .................. G05D 1/646
2022/0076004 A1 3/2022 Hasegawa

FOREIGN PATENT DOCUMENTS

| CN | 110032982 B | 5/2021 |
| KR | 101146855 B1 | 5/2012 |
| KR | 102245705 B1 | 4/2021 |
| WO | 2021171291 A1 | 9/2021 |

\* cited by examiner

SYSTEMS AND METHODS FOR COORDINATING TRAVEL OF GUIDANCE ROBOTS

BACKGROUND

The field of the disclosure relates generally to autonomous robots for guiding a user to a destination and, more particularly, to systems and methods used to coordinate the travel of multiple guidance robots that are travelling along a common route.

Autonomous or semi-autonomous robots that guide a user to a destination (also referred to herein as "guidance robots") have been proposed. For example, guidance robots have been described for assisting users within environments that are relatively heavily trafficked by pedestrians (e.g., crowded streets, shopping centers, airports, etc.) in reaching a desired destination. The guidance robot may move within the heavily trafficked environment at a suitable speed as the associated user follows or accompanies the guidance robot. The guidance robot may thereby enable the user to maneuver through the heavily trafficked environment in a manner that facilitates improving safety of the user's trek towards their destination, and while alleviating anxiety of the user, including a user that may move at a relatively slower pace than other pedestrians within the environment. Example guidance robots and related systems and methods have been described, for example, in U.S. Pat. No. 11,467,592 B2, issued on Oct. 11, 2022, and U.S. Pat. No. 10,649,467 B2, issued on May 12, 2020, and U.S. Patent Application Publication Nos. 2021/0026371 A1, published on Jan. 28, 2021, 2022/0066438 A1, published on Mar. 3, 2022, and 2022/0076004, published on Mar. 10, 2022, the disclosures of each of which are hereby incorporated by reference herein in their entirety. However, a need exists for systems and methods for use in coordinating the travel of guidance robots that are travelling along a common route while the guidance robots are guiding users towards respective destinations or while the guidance robots are travelling to meet users at a designated pick-up location.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, these statements are to be read in this light, and not as admissions of prior art.

BRIEF DESCRIPTION

One aspect is a method for coordinating travel of guidance robots while each guidance robot is guiding an associated user towards a destination. The method is implemented by a guidance robot coordination server including at least one processor and at least one memory in communication with the at least one processor. The method includes determining that at least a first guidance robot and a second guidance robot share a common route that is traveled by each of the first and second guidance robots while guiding a first user and a second user, respectively, towards the respective destination. The method also includes identifying a first user movement characteristic associated with the first user and a second user movement characteristic associated with the second user. The method also includes determining, based on the first and second user movement characteristics, a formation in which the first and second guidance robots are to be arranged while travelling along the common route. The method also includes causing the first and second guidance robots to be arranged in the determined formation while travelling along the common route.

Another aspect is a system for coordinating travel of guidance robots. The system includes at least a first guidance robot associated with a first user and a second guidance robot associated with a second user. Each of the first and second guidance robots are assigned to guide the first and second users, respectively, towards a respective destination. The system also includes a guidance robot coordination server including at least one processor and at least one memory in communication with the at least one processor. The at least one memory stores instructions that, when executed by the at least one processor, cause the at least one processor to: determine that the first guidance robot and the second guidance robot share a common route that is traveled by each of the first and second guidance robots while guiding the first and second users, respectively, towards the respective destination. The stored instructions, when executed, also cause the at least one processor to identify a first user movement characteristic associated with the first user and a second user movement characteristic associated with the second user and to determine, based on the first and second user movement characteristics, a formation in which the first and second guidance robots are to be arranged while travelling along the common route. The stored instructions, when executed, also cause the at least one processor to cause the first and second guidance robots to be arranged in the determined formation while travelling along the common route.

Another aspect is a method for coordinating travel of guidance robots while each guidance robot is travelling towards an associated user. The method is implemented by a guidance robot coordination server including at least one processor and at least one memory in communication with the at least one processor. The method includes determining that at least a first guidance robot and a second guidance robot share a common route that is traveled by each of the first and second guidance robots while travelling towards a first user and a second user, respectively. The method also includes determining that the first guidance robot and the second guidance robot are within a predetermined distance of each other. The method also includes, in response to determining that the first and second guidance robots share the common route and are within the predetermined distance of each other, causing the first and second guidance robots to be arranged in a line formation while travelling along the common route.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings are used to indicate like elements.

DETAILED DESCRIPTION

Figure 1:
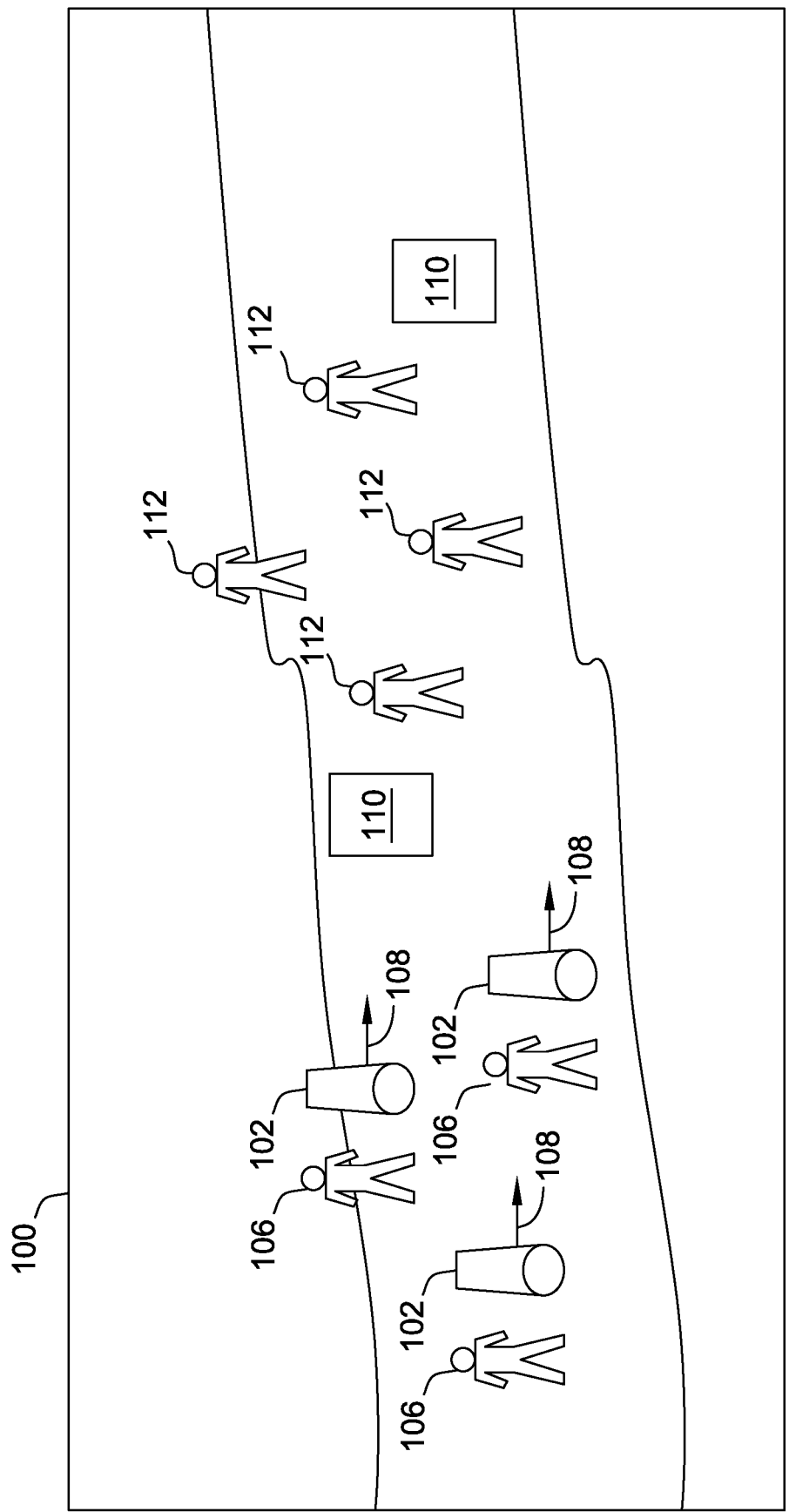
FIG. 1 illustrates an overhead view of an exemplary environment in which guidance robots are travelling along a common route.

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for coordinating the travel of guidance robots that are travelling along a common route, while each is guiding a user towards a respective destination and/or meeting a user at a respective pick-up location. Each of the guidance robots may be assigned to an associated user and each guidance robot may be assigned to guide the associated user in travelling towards a destination or assist the associated user in travelling towards a desired destination. In an exemplary embodiment, coordinating the travel of the guidance robots is performed by a guidance robot coordination ("GRC") computer device, also referred to herein as a GRC server. The GRC server may be a centralized server responsible for controlling operation of guidance robots that occupy the same common environment, wherein the centralized GRC server is in communication with each of the guidance robots to receive information from the guidance robots and to selectively process the received information to generate control outputs for transmitting to the guidance robots. The GRC server may additionally and/or alternatively be a decentralized server that includes multiple computing devices that are each included in and/or associated with the guidance robots that occupy the same common environment. The GRC server may also include multiple computing devices that are each in communication with computing devices included in and/or associated with the guidance robots.

In the exemplary embodiment, the GRC server determines a suitable formation in which to arrange multiple (i.e., two or more) guidance robots that share a common route (e.g., a sidewalk, hallway, walkway, and the like) while guiding users to respective destinations and/or while meeting users at respective pick-up locations. The GRC server may determine the suitable formation for the guidance robots based on various considerations, including, for example, whether the guidance robots are actively guiding associated users or travelling to pick-up users. In one example, if the guidance robots are travelling to meet users at respective pick-up locations, the GRC server may determine that a suitable formation for the guidance robots is a line formation, extending substantially parallel to the direction of travel, to facilitate minimizing disruption within the surrounding environment. In another example, if the guidance robots are actively guiding users towards respective destinations while travelling along the common route, the GRC server may determine that a suitable formation for the guidance robots is a line formation, extending substantially parallel to the direction of travel, in which the guidance robots and associated users are positioned based on one or more user movement characteristics (e.g., a travel speed) of the associated users. For example, the GRC server may determine a line formation, extending parallelly to the direction of travel, in which the user with the fastest travel speed, and the associated guidance robot, are positioned at the front of the line and the user with the slowest travel speed, and the associated guidance robot, are positioned at the back of the line. In still another example, if the guidance robots are actively guiding users while travelling along the common route, and the users desire to travel more intimately in a group, the GRC server may determine a suitable group formation for the guidance robots to enable group travel of the associated users. For example, the GRC server may determine a suitable group formation for group travel of the users is a side-by-side formation of the guidance robots. The group formation of the guidance robots to enable group travel of the users may also be determined based on a number of guidance robots included in the formation to facilitate minimizing disruption within the surrounding environment. For example, where three or more guidance robots are included in the formation, the GRC server may determine a suitable group formation for group travel of the users is a triangular formation or a rectangular formation. In the group formation, all of the guidance robots may be positioned in front of the associated users. Additionally and/or alternatively, in the group formation, some of the guidance robots may be positioned in front of the associated users and some of the guidance robots may be positioned behind the associated users.

The GRC server may receive sensor data from the guidance robots to determine the formation in which the guidance robots are to be arranged and/or to selectively adjust the determined formation during travel. The sensor data may be received in real-time or may be historical sensor data received from guidance robots that have previously traveled along the common route. The GRC server may identify one or more environmental parameters associated with the common route from the sensor data. For example, the GRC server may identify an environmental parameter including, but not limited to only including, a number of pedestrians located in a vicinity of the guidance robots while travelling along the common route, a width of a travel surface of the common route, and/or a location of any obstruction located along the common route. In response to an identification of an environmental parameter, the GRC server may determine and/or selectively adjust the formation to facilitate optimizing travel of the guidance robots and associated users travelling along the common route, and to facilitate minimizing disruption within the surrounding environment.

Conventionally, guidance robots that are occupying a common environment and/or travelling along a common route are operated independently. For example, movement of each guidance robot within a common environment may be independently controlled based on individual factors such as the targeted destination of the associated user and/or surrounding environmental factors, such as for example, a number of pedestrians in the area, available space for the guidance robot and the associated user to occupy, potential obstructions, etc. Typically, movement or travel of guidance robots occupying a common environment is not coordinated to harmonize flow of multiple guidance robots. The independently controlled travel of the guidance robots may cause disruptions within the surrounding environment (e.g., may disrupt a flow of pedestrians or other traffic within the surrounding environment). Such disruptions may be exacerbated as guidance robots become more commonplace in crowded environments. As a result, guidance robots may be perceived as a public nuisance. In addition, disruptions created by the guidance robots may increase social anxiety of the associated users, which may further cause the guidance robots to be perceived negatively.

Accordingly, at least one of the technical problems addressed by the exemplary systems and methods described herein may include: (i) improving the flow of multiple guidance robots travelling along a common route; (ii) reducing the likelihood of disruptions created by multiple guidance robots travelling within the same common environment; (iii) facilitating greater flexibility in coordinating the travel of guidance robots travelling along a common route; (iv) enabling users to selectively travel in groups while being guided by guidance robots; (v) facilitating environmental awareness of coordinated guidance robots; (vi) enabling real-time adjustments of a formation in which coordinated guidance robots are arranged while travelling along a common route; (vii) facilitating reducing negative perception of guidance robots; and/or (viii) facilitating improving user enjoyment of and confidence in guidance robots.

The methods and systems described herein may be implemented using computer programming or engineering techniques including computer software, firmware, hardware, or any combination or subset thereof, wherein the technical effects may be achieved by performing at least one of the following steps: i) determining that at least a first guidance robot and a second guidance robot share a common route that is traveled by each of the first and second guidance robots while guiding a first user and a second user, respectively, towards a respective destination; ii) identifying a first user movement characteristic associated with the first user and a second user movement characteristic associated with the second user; iii) determining, based on the first and second user movement characteristics, a formation in which the first and second guidance robots are to be arranged while travelling along the common route; and/or iv) causing the first and second guidance robots to be arranged in the determined formation while travelling along the common route.

In still further embodiments, the technical effects may be achieved by performing at least one of the following steps: i) determining that at least a first guidance robot and a second guidance robot share a common route that is traveled by each of the first and second guidance robots while travelling towards a first user and a second user, respectively; ii) determining that the first guidance robot and the second guidance robot are within a predetermined distance of each other; and/or iii) in response to determining that the first and second guidance robots share the common route and are within the predetermined distance of each other, causing the first and second guidance robots to be arranged in a line formation while travelling along the common route.

Referring now to the drawings, FIG. 1 illustrates an exemplary environment 100 in which guidance robots 102 are travelling along a common route 104. Each guidance robot 102 is assigned to an associated user 106. In the illustrated embodiment, each guidance robot 102 is guiding the associated user 106 within the environment 100 towards a destination. In some embodiments, one or more of the guidance robots 102 may be assigned to an associated user 106 and are travelling along the common route 104 to meet the associated user at a designated pick-up location. The users 106 that are respectively associated with the guidance robots 102 may be individuals that need and/or request assistance from, or are otherwise able to be assisted by, a guidance robot 102. The environment 100 may be a closed environment (e.g., a shopping mall, a grocery store, an airport, an amusement park, a sporting venue, and the like) or an open environment (e.g., a park, a downtown area, and the like). For example, the environment 100 may be a shopping center, and each guidance robot 102 may guide the associated user 106 between a first location (e.g., a first store) and a second, destined location (e.g., a second store) within the environment 100. In another example, the environment 100 may be an airport, and each guidance robot 102 may guide the associated user 106 between a first location (e.g., a security check area) and a second, destined location (e.g., a passenger boarding gate) within the environment 100. In the exemplary embodiment, the guidance robots 102 travel in the same direction, indicated by the arrows 108, when respectively guiding the associated users 106 towards the respective destinations and/or meeting the associated users 106 at a pick-up location.

The guidance robots 102 may encounter various obstacles while travelling along the common route 104. For example, as shown in FIG. 1, a number of obstructions 110 may exist along the common route 104. The obstructions 110 may be natural or man-made obstructions, and the types of obstructions 110 vary greatly depending on the environment 100. For example, in a closed environment 100, the obstructions 110 may be part of a building structure (e.g., load-bearing walls) that exist along walkways, hallways, and the like. Additionally and/or alternatively, the obstructions 110 may be temporary and/or permanent structures that may exist within the environment 100 (e.g., stores, kiosks, pop-up shops, fences, plants, and the like). A number of pedestrians 112 may also exist along the common route 104. The guidance robots 102 suitably move to avoid the obstacles while travelling along the common route, as described in more detail herein. Additionally and/or alternatively, the guidance robots 102 may move based on a shape and/or topography of the common route 104 to facilitate smooth and/or unimpeded movement while travelling along the common route 104 and to ensure that the guidance robots 102 continue to travel along and within the bounds of a travel surface 114 (e.g., a road or a floor) of the common route 104.

Figure 2:
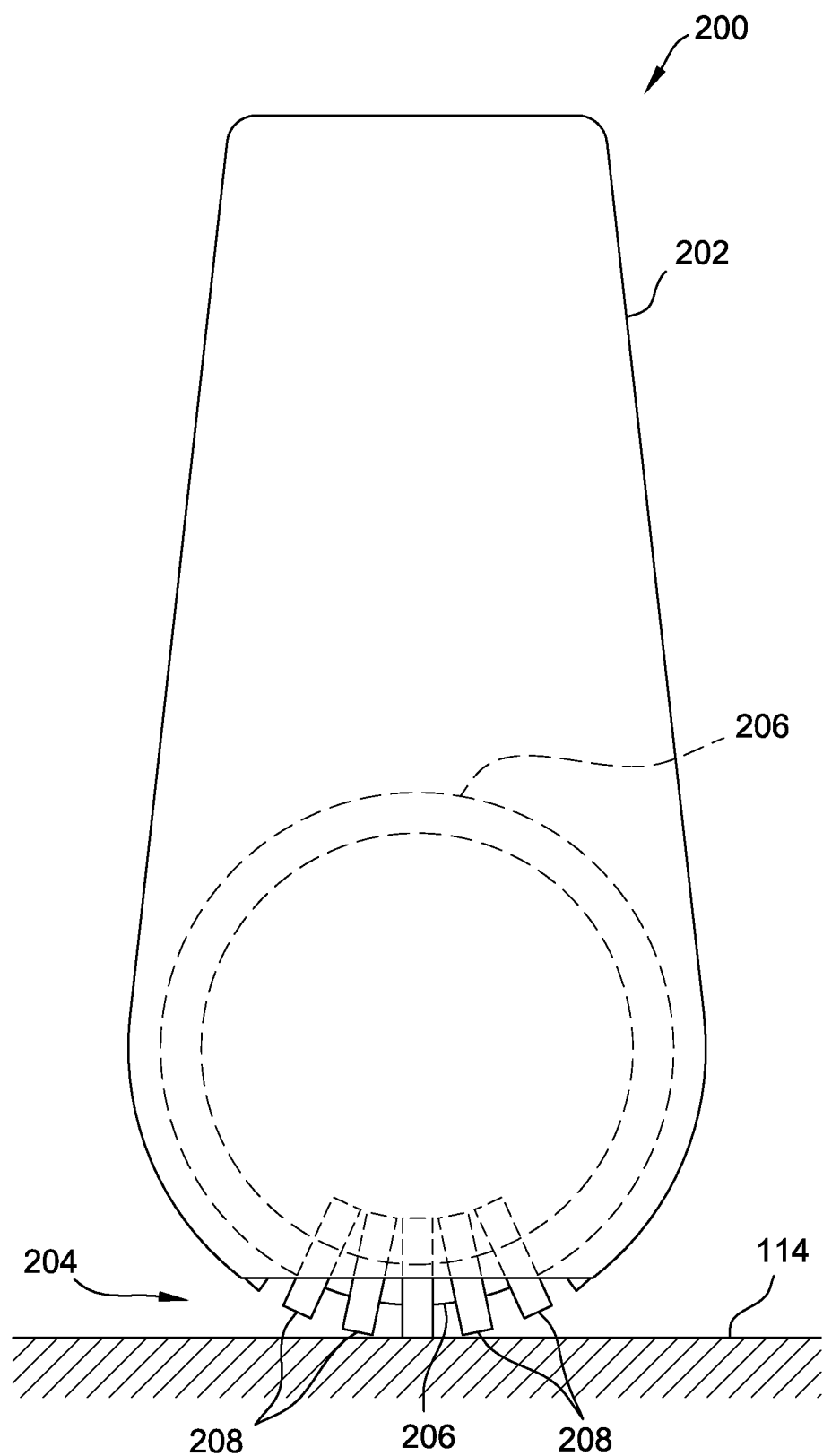
FIG. 2 depicts a side-view of an exemplary guidance robot.
Figure 3:
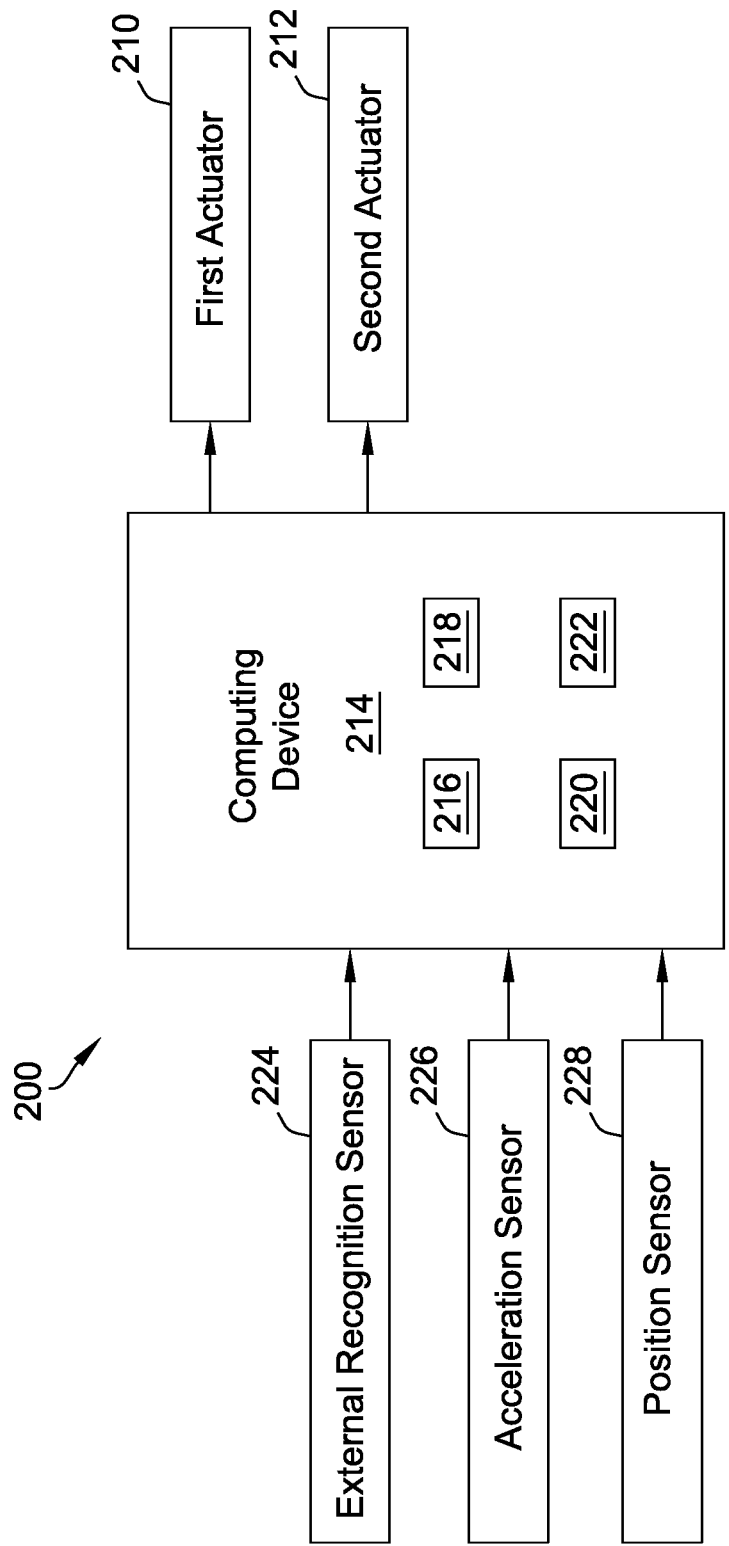
FIG. 3 is a schematic diagram of an exemplary control configuration of the guidance robot shown in FIG. 2.

FIG. 2 depicts a side-view of an exemplary guidance robot 200 and FIG. 3 is a schematic diagram of an exemplary control configuration of the guidance robot 200. The guidance robot 200 may be implemented as one of the guidance robots 102 (shown in FIG. 1) used to guide a user 106 within the environment 100. In the exemplary embodiment, the guidance robot 200 is an inverted pendulum-type vehicle that includes a base body 202 and a moving part 204. The moving part 204 is operably coupled to the base body 202 and engages a travel surface (e.g., travel surface 114 shown in FIG. 1) to facilitate movement of the guidance robot 200 across the travel surface. The guidance robot 200 shown in FIG. 2 is illustrated and described for example only. The guidance robots 102 included in the environment 100 are not limited to the exemplary guidance robot 200 shown in FIG. 2, but rather any other guidance robot that functions as described herein may be used. The guidance robots 102 may be equipped with any suitable hardware and/or software that enable the guidance robot 102 to function as described herein.

As shown in FIG. 2, the moving part 204 of the guidance robot 200 includes an annular core body 206 and a plurality of annular rollers 208. The core body 206 may be rotatably coupled within the base body 202 via a central shaft (not shown) that extends through a central axis of the core body 206, such that the core body 206 is thereby rotatable about its central axis. The annular rollers 208 are spaced at angular intervals in a circumferential direction of the core body 206 (i.e., about the central axis of the core body 206). Only a portion of the rollers 208 are shown in FIG. 2, with additional rollers 208 not shown being located within the base body 202. Each of the rollers 208 is coupled to and is rotatable integrally with the core body 206 (i.e., rotation of the core body 206 about its central axis causes the rollers 208 to collectively rotate about the central axis of the core body 206). Each roller 208 is also rotatable independent of the core body 206 at its respective angular position about a respective rotational axis. More specifically, the rollers 208 independently rotate at their respective angular positions about a rotational axis that is tangential to the circumferential direction defined by the core body 206. The core body 206 and the rollers 208 are rotatably driven as described above to enable the guidance robot 200 to move in all directions across the travel surface 114.

With additional reference to FIG. 3, the guidance robot 200 also includes a first actuator 210 and a second actuator 212. The first actuator 210 and the second actuator 212 cooperate to generate a driving force for moving the moving part 204 and to control movement of the guidance robot 200. In particular, the first actuator 210 rotationally drives the core body 206 and the second actuator 212 rotational drives the rollers 208. The first actuator 210 and the second actuator 212 may be operated using, for example, electric motors, electromagnetic generators, hydraulic actuators, and the like. The first actuator 210 and the second actuator 212 may include any suitable power transmission system for generating rotary driving force for the core body 206 and the rollers 208, respectively.

Still referring to FIG. 3, the guidance robot 200 also includes a computing device 214 for use in controlling operation of the guidance robot 200 (e.g., movement of the guidance robot 200 via the first and second actuators 210 and 212). The computing device 214 includes any suitable computing device or computer system that enables the guidance robot 200 to function as described herein. In the exemplary embodiment, the computing device 214 includes one or more processors 216 and a memory area 218 or memory 218. The processor 216 executes instructions stored in the memory 218. In some embodiments, the computing device 214 may include more than one (i.e., two or more) computing devices 214 acting in parallel, each including one or more processors 216 and/or a memory 218.

Stored in the memory 218 are processor-executable instructions for receiving and processing input. The input may be received from one or more sensors, such as sensors 224-228 and/or one or more remote devices, such as server 302 or a user terminal 304 (shown in FIG. 4). The memory 218 may include, but is not limited to including, any computer-operated hardware suitable for storing and/or retrieving processor-executable instructions and/or data. The memory 218 may include random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). Further, the memory 218 may include multiple storage units such as hard disks or solid state disks in a redundant array of inexpensive disks (RAID) configuration. The memory 218 may include a storage area network (SAN) and/or a network attached storage (NAS) system. In some embodiments, the memory 218 includes memory that is integrated in computing device 214. For example, control unit 702 may include one or more hard disk drives as the memory 218. The memory 218 may also include memory that is external to the computing device 214 and may be accessed by a plurality of computing devices 214. The above memory types are for example only, and are thus not limiting as to the types of memory usable for storage of processor-executable instructions and/or data.

The computing device 214 also includes an interface component 220. The interface component 220 may include at least one media output component for presenting and/or conveying information to a user. For example, the interface component 220 may include an output adapter such as a video adapter and/or an audio adapter that may be operatively connected to the processor 216 and operatively connectable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in the interface component 220. The interface component 220 may additionally and/or alternative include an input device for receiving input from the user. For example, the interface component 220 may include a keyboard, a pointing device, a mouse, a stylus, a touch sensitive panel (e.g., a touch pad or a touch screen), or an audio input device. A single interface component 220 such as a touch screen may function as both an output device of the media output component and the input device, or multiple interface components 220 may be included.

The computing device 214 also includes a communication interface 222, which may be communicatively coupled to one or more remote devices. For example, the communication interface 222 may enable communication between the server 302 (FIG. 4) and the computing device 214 and/or between one or more of the user terminals 304 (FIG. 4) and the computing device 214. Additionally and/or alternatively, the communication interface 222 enables communication between guidance robots 200, such as between guidance robots 200 occupying a common environment (e.g., the environment 100). The communication interface 222 may include, for example, any transceiver device that enables wired and/or wireless communication with a remote device. For example, the communication interface 222 may enable the computing device 214 to be communicatively coupled to a remote device via any suitable interface including, but not limited to including, at least one of a network, such as the Internet, a local area network (LAN), a wide area network (WAN), an integrated services digital network (ISDN), or a cloud network (e.g., a network implemented using a 3G, 4G, 5G, or LTE network), a dial-up-connection, a digital subscriber line (DSL), a cellular phone connection, a cable modem, a Wi-Fi connection, and a Bluetooth® connection.

Still referring to FIG. 3, the guidance robot 200 includes a plurality of sensors 224-228 that enable the guidance robot 200 to observe its surrounding environment (e.g., the environment 100). Outputs from the sensors of the guidance robot 200 may be received by the computing device 214 and used to control operation (e.g., movement via the first and second actuator 210 and 212) of the guidance robot 200. The sensors 224-228 may include, but are not limited to including, radar, LIDAR, proximity sensors, ultrasonic sensors, wide RADAR, long distance RADAR, Global Positioning System (GPS), video devices, imaging devices, cameras, audio recorders, computer vision, accelerometers, gyroscopes, and the like. In the exemplary embodiment, the guidance robot 200 includes an external recognition sensor 224 (e.g., camera, radar, and/or LIDAR) for detecting objects within the surrounding environment (e.g., obstructions 110 and/or pedestrians 112 within the environment 100). The guidance robot 200 also includes an acceleration sensor or accelerometer 226 for detecting an acceleration of the guidance robot 200. The guidance robot 200 also includes a position sensor 228, which may be a global positioning system (GPS) module, for detecting a position of the guidance robot 200 (e.g., by acquiring coordinates of the guidance robot 200). In some embodiments, the guidance robot 200 may include more or fewer sensors and may include any type of sensor that enables the guidance robot 200 to function as described herein.

Figure 4:
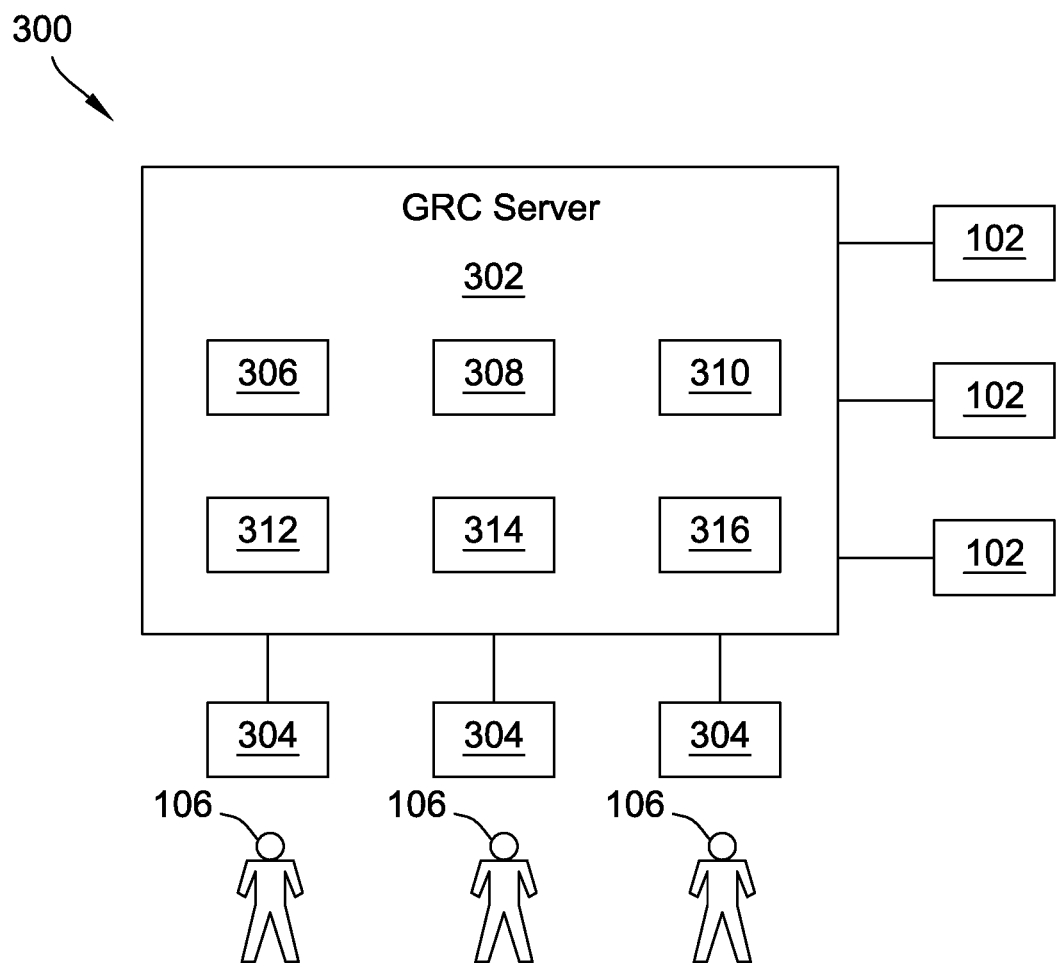
FIG. 4 is a schematic diagram of an exemplary system for use in coordinating the travel of guidance robots within an environment.

FIG. 4 is a schematic diagram of an exemplary system 300 for use in coordinating the travel of the guidance robots 102 within the environment 100 (shown FIG. 1). In the exemplary embodiment, the system 300 includes the guidance robots 102, a guidance robot coordination ("GRC") server 302, and user terminals 304. The guidance robots 102 may include the guidance robot 200 shown in FIGS. 2 and 3. The GRC server 302 operates to control a desired formation that the guidance robots 102 are arranged into while the guidance robots 102 are travelling along the common route 104. The GRC server 302 may be implemented as a central server that is remote from, and communicatively coupled with, each of the guidance robots 102 and the user terminals 304. Additionally and/or alternatively, the GRC server 302 may be implemented as a decentralized server that includes the computing devices of the guidance robots 102 (e.g., computing devices 214 shown in FIG. 3) communicating over a network (e.g., a cloud network implemented using a 3G, 4G, 5G, or LTE network).

The user terminals 304 enable users 106 to communicate with the GRC server 302 and the guidance robots 102. In the exemplary embodiment, the user terminals 304 may be computers that include a web browser or a software application to enable the user terminal 304 to access the GRC server 302, and vice versa, using an indirect connection, such as via the Internet, or using a direct connection, such as a cellular network connection. Additionally, the user terminals 304 may be communicatively coupled to the guidance robots 102 via the GRC server 302 and/or through various interfaces such as the Internet or a direct connection. The user terminals 304 may be communicatively coupled to the Internet through many interfaces including, but not limited to, at least one of a network, such as the Internet, a local area network (LAN), a wide area network (WAN), an integrated services digital network (ISDN), or a cloud network (e.g., a network implemented using a 3G, 4G, 5G, or LTE network), a dial-up-connection, a digital subscriber line (DSL), a cellular phone connection, and a cable modem. The user terminals 304 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. In some embodiments, the user terminals 304 may additionally and/or alternatively include a fixed reception terminal (e.g., a kiosk computer) located within an environment (e.g., the environment 100).

In the exemplary embodiment, a user 106 accesses the GRC server 302 using one of the user terminals 304 (e.g., via a web browser or software application executing on the user terminal 304). The user 106 may submit, via the user terminal 304, a guidance request that indicates the user 106 desires to be guided by a guidance robot 102 to a desired destination within the environment 100. The guidance request submitted by the user 106 may include a desired destination, a desired pick-up time, and a desired arrival time at the destination. The user 106 may also include in the guidance request information associated with the user 106, such as, for example, a name, age, gender, chronic disease, presence or absence of disability, pregnancy status, presence or absence of a companion (e.g., another user 106), a past use history, a preferred guidance speed, and/or a preferred route of the user 106 to arrive at the destination. The GRC server 302 may additionally and/or alternatively query the user terminal 304 for information associated with the user 106. For example, the user terminal 304 may be a user computing device associated with the user 106 that stores information associated with the user 106, and the GRC server 302 may query the user terminal 106 for user information in response to a guidance request received from the user 106.

Additionally and/or alternatively, the GRC server 302 may store data associated with the user 106 submitting a guidance request. In the exemplary embodiment, the GRC server 302 includes and/or is in communication with a database 306. The database 306 may store information associated with a user 106, for example, name, age, gender, chronic disease, presence or absence of disability, pregnancy status, past companions (e.g., other users 106), preferred pick-up time(s), preferred arrival time(s), preferred destination(s), preferred route(s) to arrive at a destination, a preferred guidance speed, and/or a past use history. In some embodiments, the database 306 may be stored in the GRC server 302. In some embodiments, the database 306 may be stored remotely from GRC server 302. In some embodiments, the database 306 may be decentralized.

In response to the guidance request, the GRC server 302 may assign a guidance robot 102 within the environment 100 to the user 106 and cause the guidance robot 102 to meet or pick-up the user 106, and to subsequently guide the user 106 towards the desired location. In the exemplary embodiment, the GRC server 302 may include a robot tracking unit 308 that monitors a status (e.g., active or idle) and a position or location of each of the guidance robots 102 within the environment 100. The GRC server 302 may also include a route determination unit 310 that determines a route for guiding a user 106 (e.g., between a pick-up location and desired destination received from the user 106 in the guidance request). The GRC server 302 may also include a transmission unit 312 that transmits information to a guidance robot 102 indicating that the guidance robot 102 is assigned to the user 106 and the determined route for guiding the user 106. Information transmitted via the transmission unit 312 may also include user information stored in the database 306 and/or received from the user 106 in the guidance request. The user information may be used to identify one or more user characteristics (e.g., user movement characteristics, such as a travel speed) to enable a guidance robot 102 to guide the user 106 at a suitable guidance speed. Exemplary functions of the GRC server 302 (e.g., implemented by the robot tracking unit 308, the route determination unit 310, and/or the transmission unit 312) may be executed using any suitable hardware and/or software configuration. For example, the GRC server 302 may include one or more processing units and one or more memory (e.g., stored in database 306) that stores instructions executable by the processing unit(s) to achieve the functionality of the GRC server 302 described herein. Some or all of the functionality described for the GRC server 302 may additionally and/or alternatively be implemented by the guidance robots 102 (e.g., using the computing device 214).

In the exemplary embodiment, the GRC server 302 may also receive sensor data from the guidance robots 102 within the environment 100, such as sensor data obtained from the sensors 224-228. The GRC server 302 may include an environmental modeling unit 314 used to identify environmental parameters within the environment 100 based on the sensor data, which may be real-time sensor data and/or sensor data stored in the database 306. The identified environmental parameters may be leveraged by the guidance robots 102 while travelling along the determined route when guiding the user towards the desired destination. For example, the environmental modeling unit 314 may utilize real-time data and/or historical sensor data to identify a number of obstacles (e.g., obstructions 110 and/or pedestrians 112) at discrete locations within the environment and/or to identify the locations of the obstacles within the environment 100. Additionally and/or alternatively, the environmental modeling unit 314 may identify environmental parameters associated with one or more travel surfaces (e.g., the travel surface 114) within the environment 100, such as a width of the travel surface 114. The environmental modeling unit 314 may selectively and/or continuously update the identified environmental parameters using sensor data, for example, sensor data received from the guidance robots 102 in real-time. The identified environmental parameters may be transmitted, via the transmission unit 312, to the assigned guidance robot 102 along with the determined route for guiding the associated user 106 to enable the guidance robot 102 to have a better understanding of the complexity of the surrounding environmental while guiding the user 106. In some embodiments, the functionality of the environmental modeling unit 314 may additionally and/or alternatively be implemented by the guidance robots 102 (e.g., using the computing device 214).

In operation, after receiving the guidance request, the GRC server 302 may determine a suitable guidance robot 102 to assign the user 106 using the robot tracking unit 308.

For example, the GRC server 302 may determine, via the robot tracking unit 308, the guidance robots 102 within the environment 100 that are available for being assigned to the user 106 (e.g., guidance robots 102 that are not currently assigned to another user 106). The GRC server 302 may compare the respective locations of the available guidance robots 102 within the environment 100 and determine the guidance robot 102 that is both available and that is closest in proximity to the pick-up location of the user 106. The GRC server 302 may then assign this guidance robot 102 to the user 106, which may include transmitting information, via the transmission unit 312, to the guidance robot 102 indicating the assignment and updating the robot tracking unit 308 to indicate the assignment. Before, during, and/or after assigning the guidance robot 102 to the user 106, the GRC server 302 may determine the route for guiding the user 106 between the pick-up location and the desired destination using the route determination unit 310 and transmit the determined route to the assigned guidance robot 102 via the transmission unit 312. The GRC server 302 may also transmit, via the transmission unit 312, user information to the assigned guidance robot 102, such as a user movement characteristic (e.g., a travel speed) to enable the guidance robot 102 to move at a suitable guidance speed when guiding the user 106. The GRC server 302 may also transmit, via the transmission unit 312, environmental parameters identified by the environmental modeling unit 314 to the assigned guidance robot 102. The identified environmental parameters transmitted to the assigned guidance robot 102 may suitably be specific to the determined route. For example, the identified environmental parameters transmitted to the assigned guidance robot 102 may include a number of obstacles (e.g., obstructions 110 and/or pedestrians 112) in a vicinity of the determined route and/or the locations of the obstacles along the determined route. Additionally and/or alternatively, the identified environmental parameters transmitted to the assigned guidance robot 102 may include identified environmental parameters associated with one or more travel surfaces (e.g., the travel surface 114) of the determined route, such as a width of the travel surface 114.

In some embodiments, a guidance robot 102 may perform any and/or all of these functions. For example, the GRC server 302 may receive a guidance request from a user 106 and transmit, via the transmission unit 312, the guidance request, information associated with the user 106, and/or sensor data to the guidance robots 102. The guidance robots 102 may then determine, via the respective computing devices 214, the most suitable guidance robot 102 for guiding the user 106 (e.g., based on respective availability and locations of the guidance robots 102), the route for guiding the user 106 between the pick-up location and the desired destination, and/or a suitable guidance speed for the user 106. Once assigned to a user 106, the guidance robot 102 may move autonomously to the pick-up location and subsequently guide the user 106 within the environment 100 towards the desired destination. The guidance robot 102 may leverage sensor data received from the GRC server 302 in addition to sensor data obtained in real-time to identify and maneuver environmental parameters as the guidance robot 102 travels towards the pick-up location and between the pick-up location and the desired destination.

Still referring to FIG. 4, in the exemplary embodiment, the GRC server 302 also includes a robot coordination unit 316 for determining a desired formation to arrange two or more guidance robots 102 travelling within the environment 100 along a common route (e.g., the common route 104 shown in FIG. 1). The robot coordination unit 316 is suitably in communication with the database 306, the robot tracking unit 308, the route determination unit 310, the transmission unit 312, and the environmental parameter unit 314, and utilizes the functionality thereof to determine suitable formations for the guidance robots 102.

Figure 5:
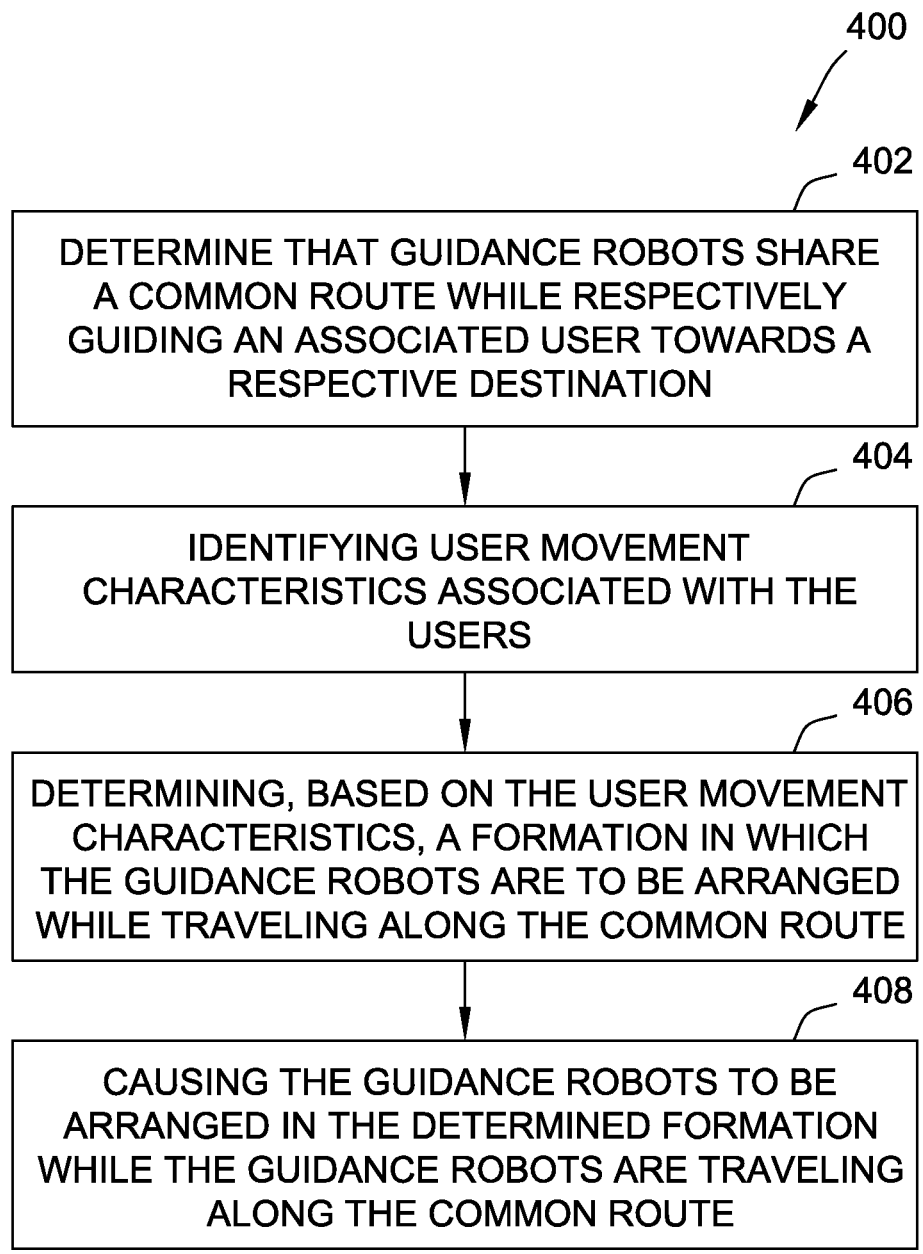
FIG. 5 shows an exemplary method for use in coordinating the travel of guidance robots that are each guiding an associated user towards a destination.

With additional reference to FIG. 5, an exemplary method 400 for coordinating the travel of guidance robots 102, while each guidance robot 102 is guiding an associated user 106 towards a destination, is shown. In the exemplary embodiment, the method 400 is implemented by the GRC server 302, for example, via the robot coordination unit 316 using at least one processor executing instructions that are stored in at least one memory in communication with the at least one processor. The exemplary method 400 may be used to coordinate the travel of guidance robots 102 that are travelling along the common route 104 within the environment 100 shown in FIG. 1.

The method 400 includes determining 402 that multiple (i.e., two or more) guidance robots 102 share a common route 104 that is traveled by each of the guidance robots 102 while respectively guiding an associated user 106 towards a respective destination. In the exemplary embodiment, the robot coordination unit 316 may determine 402 that multiple guidance robots 102 share the common route 104 based on information received from the robot tracking unit 308 and the route determination unit 310. For example, the robot coordination unit 316 may receive information from the robot tracking unit 308 that identifies the guidance robots 102 within the environment 100 that are currently assigned to guide an associated user 106 towards a desired destination. The robot coordination unit 316 may also receive information from the route determination unit 310 that is indicative of the determined route for each of the guidance robots 102 that are currently assigned to guide an associated user 106 towards the desired destination. The robot coordination unit 316 may parse the information received from the robot tracking unit 308 and the route determination unit 310 to determine 402 that at least two guidance robots 102 that are currently assigned to guide an associated user 106 towards the desired destination will share a common route 104 over at least a portion of the respective determined routes.

Figure 6:
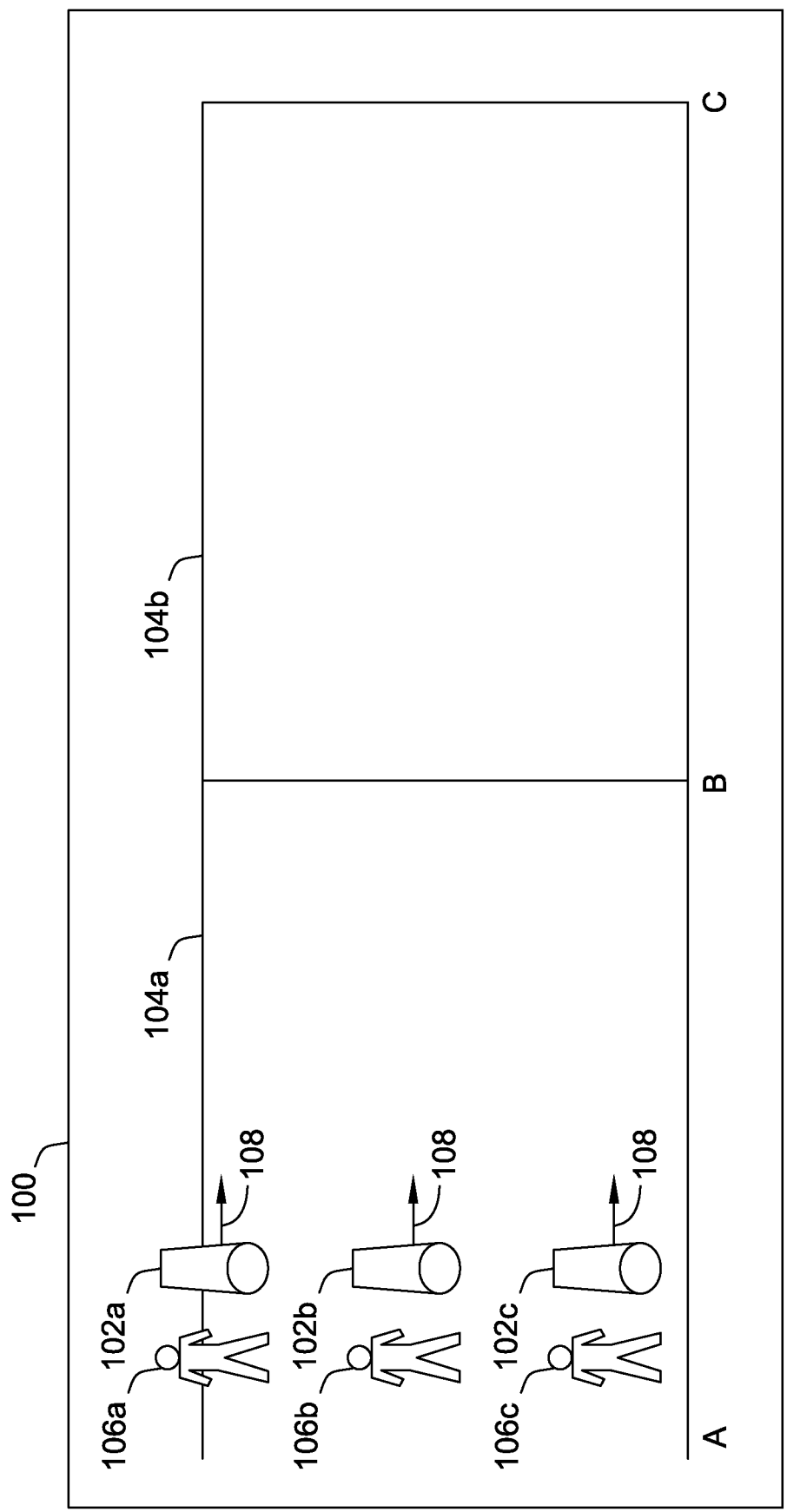
FIGS. 6-9 depict various formations in which guidance robots may be arranged in accordance with the method shown in FIG. 5.

To illustrate, reference is made to FIG. 6 which depicts an example wherein the information is received from the robot tracking unit 308 and the route determination unit 310 and indicates that a first guidance robot 102a within the environment 100 is currently assigned to guide a first user 106a towards a destination B. Moreover, in the example illustrated in FIG. 6, a second guidance robot 102b within the environment 100 is currently assigned to guide a second user 106b towards a destination C, and a third guidance robot 102c within the environment 100 is currently assigned to guide a third user 106c towards the destination C. The robot coordination unit 316 determines 402 that the guidance robots 102a-102c and the associated users 106a-c share a common route 104a in the travel direction 108 between a location A and the destination B. The robot coordination unit 316 also determines 402 that the guidance robots 102b and 102c share a second common route 104b between the destination B and the destination C. The location A may be a pick-up location common among users 102a-c, or may be a location within the environment 100 at which the guidance robots 102a-102c and the associated users 106a-c converge (e.g., are within a predetermined distance of each other). In the latter scenario, the guidance robots 102a-102c and the associated users 106a-c may converge based on different guidance speeds. The converging location A may be determined and/or predicted by the robot coordination unit 316 based on information associated with each of the users 102*a-c* (e.g., a movement characteristic of each user 106*a*-106*c*, a preferred guidance speed of each user 106*a*-106*c*, a pick-up location of each user 106*a*-106*c*, a pick-up time of each user 106*a*-106*c*, and/or a preferred time to arrive at the destination of each user 106*a*-106*c*).

The information utilized by the robot coordination unit 316 to determine the converging location A may be stored in the database 306, received from the user terminals 304 and/or the guidance robots 102 (e.g., sensor data from the position sensors 228), and/or otherwise determined or provided by the GRC server 302. In some embodiments, the robot coordination unit 316 may determine and/or predict that a converging location A does not exist for the guidance robots 102*a*-102*c* and the associated users 106*a-c*. For example, the robot coordination unit 316 may determine that, as the guidance robots 102*a*-102*c* are guiding the associated users 106*a*-106*c*, at no point in time will the guidance robots 102*a*-102*c* and the associated users 106*a-c* be within close enough proximity to each other to justify coordinating the travel of the guidance robots 102*a*-102*c*, as this may interrupt arrival times, introduce inefficiencies to the guiding operation, or otherwise create disruptions within the environment 100. In some embodiments, the robot coordination unit 316 may require that the associated users 106*a-c* share a common pick-up location in order to proceed with coordinating the travel of the assigned guidance robots 102*a*-102*c*.

Description of the exemplary method 400 will proceed with reference to the scenario shown in FIG. 6 (and FIGS. 7 and 8 described further below) wherein three guidance robots 102*a*-102*c* and three associated users 106*a*-106*c* are determined 402 to share a common route. In other embodiments, the number of guidance robots 102 and users 106 that are determined 402 to share a common route may vary. For example, the robot coordination unit 316 may determine 402 that two guidance robots 102*a*-102*c* and two associated users 106*a*-106*c* share a common route, that four guidance robots 102*a*-102*c* and four associated users 106*a*-106*c* share a common route, that five guidance robots 102*a*-102*c* and five associated users 106*a*-106*c* share a common route, and so on. Moreover, in some embodiments, the number of guidance robots 102 may be different from the number of users 106. For example, in some embodiments, one guidance robot 102 may be assigned to two or more than two users 106, and vice versa.

Referring again to FIG. 5, in the exemplary method 400, a user movement characteristic associated with each of the first user 106*a*, the second user 106*b*, and the third user 106*c* is identified 404. The user movement characteristic may include, for example, a travel speed of the users 106*a*-106*c*. The user movement characteristics may be identified 404 based on a user preference or other information provided by the users 106*a*-106*c*. For example, when submitting the guidance request, the users 106*a*-106*c* may include in the request a preferred travel speed to adjust a guidance speed at which the assigned guidance robot 102 moves. The user movement characteristics may additionally and/or alternatively be identified 404 based on user information stored in the database 306 and/or received by the GRC server 302 (e.g., by querying a user terminal 304 associated with each of the users 106*a*-106*c*). For example, the GRC server 302 may store and/or receive information associated with past use of each of the users 106*a*-106*c* and identify 404 a historical average travel (or guidance) speed of each of the users 106*a*-106*c*. Additionally and/or alternatively, the user movement characteristics may be identified 404 by the GRC server 302 making an inference based on relevant user information, including, for example, age, chronic disease, presence or absence of a disability, pregnancy status, and/or other relevant information of each of the users 106*a*-106*c*. The user movement characteristics may be identified 404 using the robot coordination unit 316 or may be identified 404 and subsequently received by the robot coordination unit 316.

The method 400 also includes determining 406, based on the identified 404 user movement characteristics, a formation in which the guidance robots 102*a*-102*c* are to be arranged while travelling along the common route 104*a*. In an exemplary embodiment, with reference to FIG. 7, the robot coordination unit 316 determines 406 that the guidance robots 102*a*-102*c* are to be arranged in a line formation, extending substantially parallel to the travel direction 108. The line formation shown in FIG. 7 may be determined 406 to facilitate optimizing the flow of the guidance robots 102*a*-102*c* and the associated users 106*a*-106*c* while travelling along the common route 104*a*. As shown in FIG. 1, a number of pedestrians 112 may be in a vicinity of the common route 104*a*. Arranging the guidance robots 102*a*-102*c* and the associated users 106*a*-106*c* in the line formation, extending substantially parallel to the travel direction 108, may facilitate minimizing disruptions that may otherwise be caused to or created by the pedestrians 112, and thus facilitate reducing the likelihood that the guidance robots 102*a*-102*c* will be perceived as a public nuisance. Moreover, arranging the guidance robots 102*a*-102*c* in the line formation shown in FIG. 7 may facilitate reducing social anxiety of the users 106*a*-106*c* as the flow of their guided travel through the environment 100 is optimized and the span of their arrangement is minimized.

Figure 7:
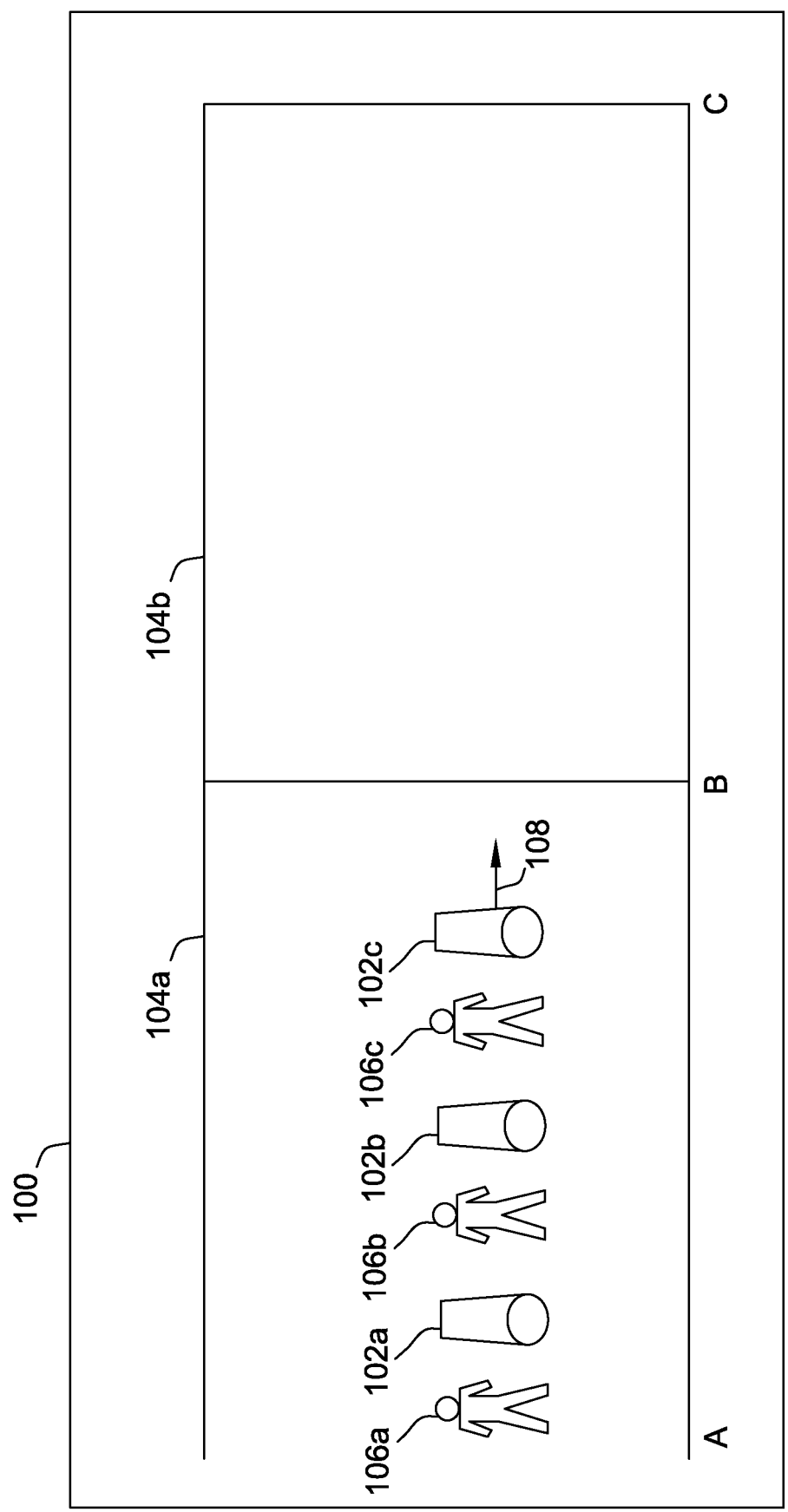

Still referring to FIG. 7, the line formation of the guidance robots 102*a*-102*c* and the associated users 106*a*-106*c* also suitably positions the users 106*a*-106*c* in a hierarchy along the travel direction 108 based on the identified 404 user movement characteristics. For example, in some instances, the guidance robot 102*c* may be assigned to the user 106*c* who has the fastest identified travel speed, and the guidance robot 102*a* may be assigned to the user 106*a* having the slowest travel speed. As shown in FIG. 7, in the determined 406 line formation, the guidance robots 102*a*-102*c* are arranged such that the associated users 106*a*-106*c*, who follow the assigned guidance robots 102*a*-102*c*, are positioned in descending order based on travel speed, relative to the travel direction 108. That is, the fastest user 106*c* follows the guidance robot 102*c* at the front of the line, the slowest user 106*a* follows the guidance robot 102*a* at the back of the line, and the middle user 106*b* is sandwiched therebetween. Positioning the users 106*a*-106*c* in this orientation may facilitate minimizing disruptions and optimizing the flow of the guidance robots 102*a*-102*c* and the associated users 106*a*-106*c* as the guidance robots and associated users that are moving at a relatively faster speed are not slowed down by the guidance robots and associated users that are moving at a relatively slower speed.

In other embodiments, it may not be desirable to arrange the guidance robots 102*a*-102*c* such that the users 106*a*-106*c* are positioned from fastest to slowest. For example, where the users 106*a*-106*c* are travel companions, it may be desirable to position faster users behind slower users to ensure that the slower users do not get left behind from the group. In some embodiments, in the determined 406 line formation, the guidance robots 102*a*-102*b* may be arranged such that the users 106*a*-106*c* positioned in ascending order based on travel speed, relative to the travel direction. For example, in FIG. 7, the guidance robot 102c may be assigned to the user 106c having the slowest identified travel speed, and the guidance robot 102a may be assigned to the user 106a having the fastest travel speed, such that, when the guidance robots 102a-102c are arranged in the determined 406 line formation, the slowest user 106c follows the guidance robot 102c at the front of the line, the fastest user 106a follows the guidance robot 102a at the back of the line, and the middle user 106b is sandwiched therebetween.

In some embodiments, the robot coordination unit 316 may determine 406 a formation in which to arrange the guidance robots 102a-102c that enables the users 106a-106c to travel more intimately in a group. The robot coordination unit 316 may determine 406 the group formation for the guidance robots 102a-102c in response to an input received from at least one of the users 106a-106c. For example, upon submitting a guidance request, one or more of the users 106a-106c may indicate that another one of the users 106a-106c is a travel companion and/or that the user 106a-106c prefers to travel in a group setting. Additionally and/or alternatively, the robot coordination unit 316 may determine 406 the group formation in response to detecting that at least two of the users 106a-106c have previously traveled together, that at least two of the users 106a-106c have identified each other as travel companions, and/or that at least two of the users 106a-106c prefer to travel in a group. Prior to determining 406 the group formation, the users 106a-106c may be prompted, via the associated user terminal 304, to accept an invitation for the group formation. For example, in some instances, the GRC server 302 may detect that, based on the past use history of the users 106a-106c, that none of the users 106a-106c, or only some of the users 106a-106c, have previously traveled together, and may thus prompt all the users 106a-106c to approve of the group formation.

Figure 8:
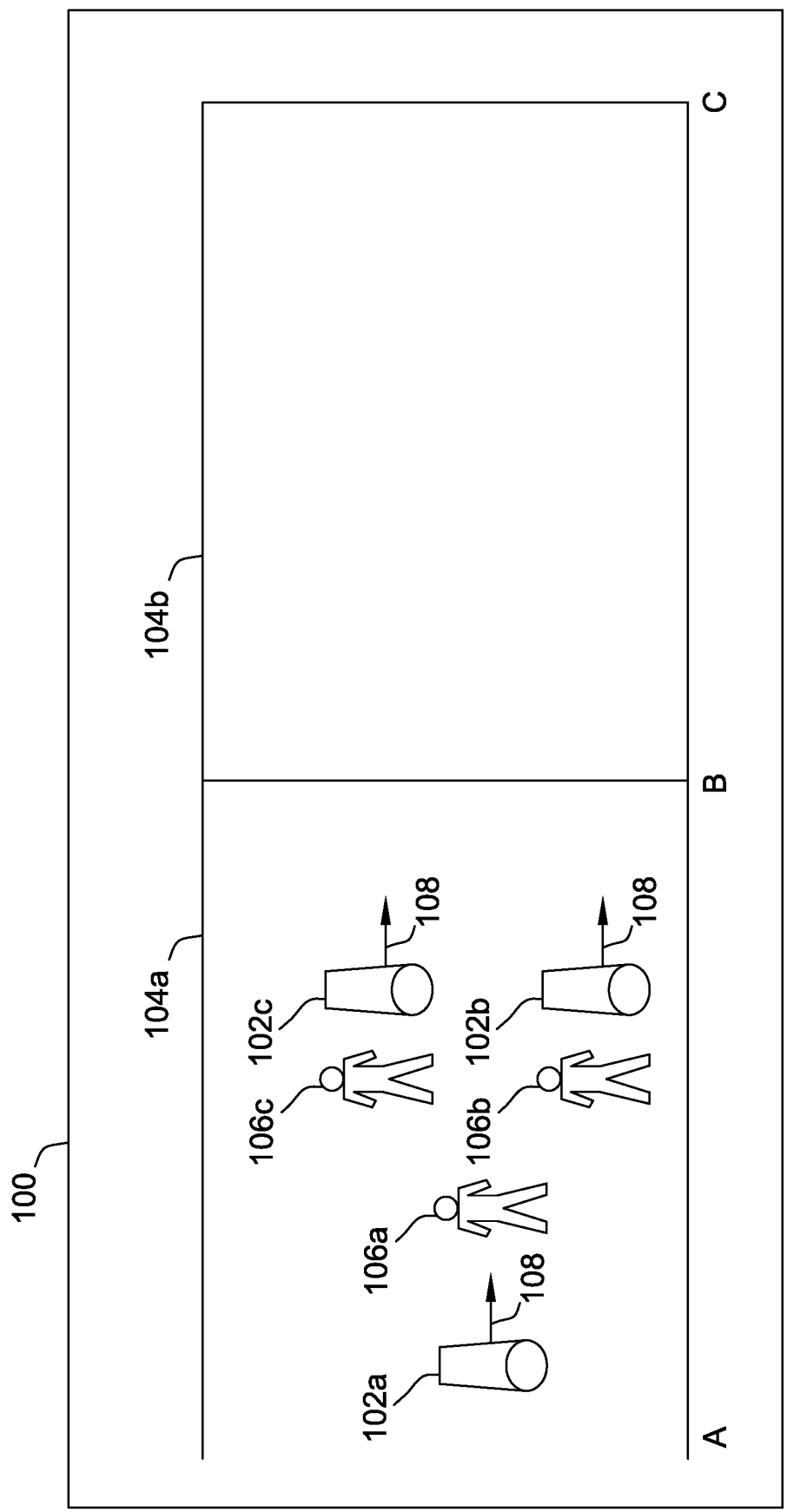
Figure 9:
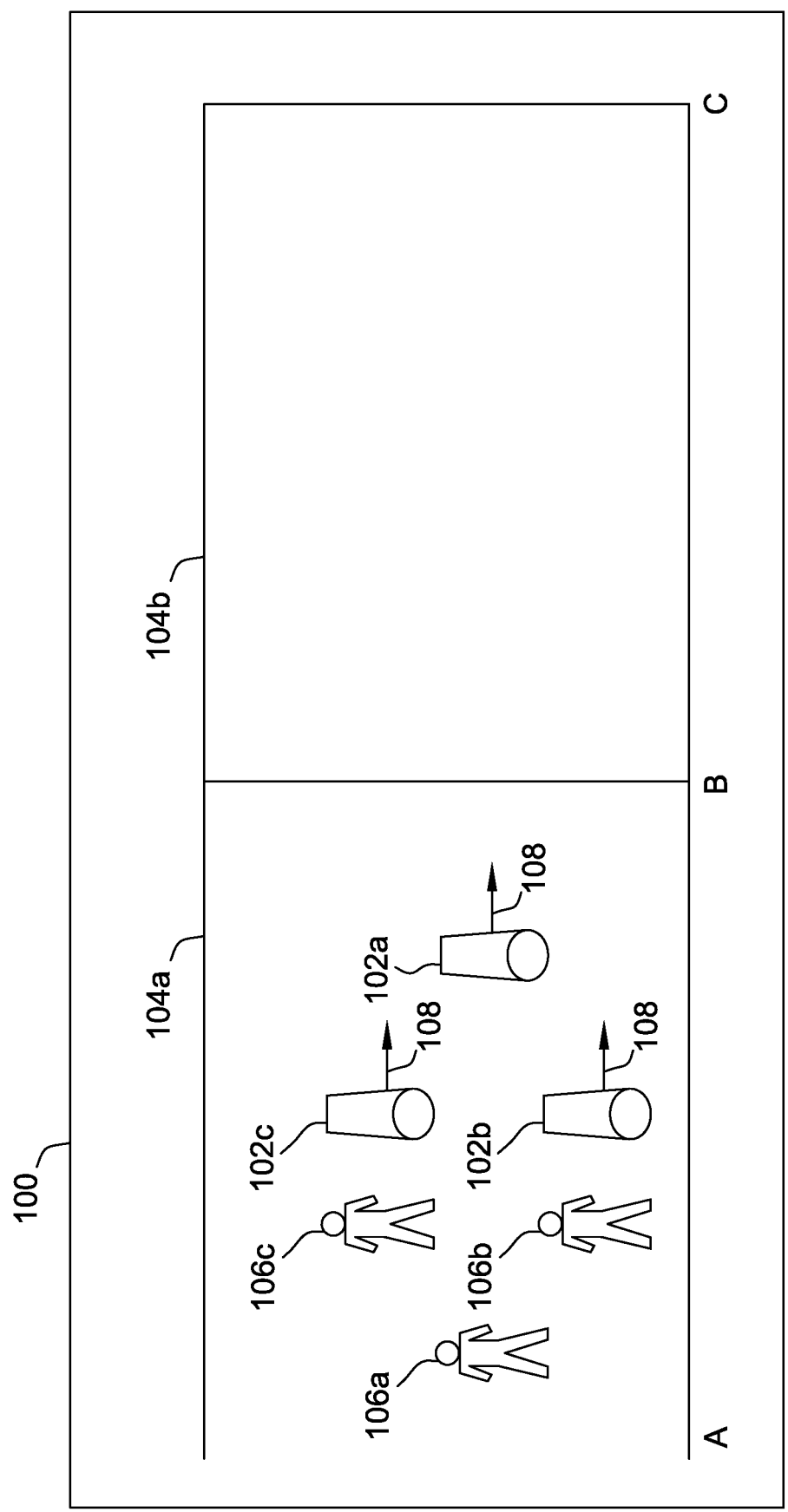

FIGS. 8 and 9 depict exemplary group formations determined 406 by the robot coordination unit 316. In FIG. 8, the guidance robots 102a-102c, and the associated users 106a-106c, are arranged such that two of the guidance robots 102b and 102c are positioned in front of the users 106a-106c and one of the guidance robots 102a is positioned behind the users 106a-106c. In other embodiments, two of the guidance robots 102b and 102c may be positioned behind the users 106a-106c and one of the guidance robots 102a may be positioned in front of the users 106a-106c. In still other embodiments, as shown in FIG. 9, each of the guidance robots 102a-102c may be positioned in front of the users 106a-106c, and the guidance robots 102a-102c are arranged in a substantially triangular formation with one of the guidance robots 102a positioned in front of the other guidance robots 102b and 102c. The determined 406 group formation, such as the formations shown in FIGS. 8 and 9, suitably enables the users 106a-106b to move intimately in a group while facilitating minimizing the space occupied by the guidance robots 102a-102c and the associated users 106a-106c to thereby minimize disruptions to pedestrian traffic caused by the group formation.

In other embodiments wherein more or fewer users 106 are being guided, different group formations in which the guidance robots are arranged may be determined 406. For example, where two users 106 are being guided, a determined 406 group formation may include positioning the guidance robots 102 side-by-side, or positioning one of the guidance robots 102 in front of the users 106 and the other one of the guidance robots 102 behind the users 106. In another example, where four users 106 are being guided, a determined 406 group formation may include positioning two of the guidance robots 102 in front of the users 106 and two of the guidance robots 102 behind the users 106, or positioning each of the guidance robots 102 in front of the users 106 and arranging the guidance robots 102 in a 2×2 formation to facilitate minimizing the space occupied by the guidance robots 102 and the associated users 106.

After the robot coordination unit 316 determines 406 the formation in which the guidance robots 102a-102c are to be arranged, the guidance robots 102a-102c are prompted/caused 408 to be arranged in the determined 406 formation while the guidance robots 102a-102c are travelling along the common route 104a. For example, the GRC server 302 may transmit information via the transmission unit 312 to the guidance robots 102a-102c that enables the guidance robots 102a-102c to move into the determined 406 formation. The GRC server 302 may also transmit a notification to the users 106a-106c (e.g., via the associated user terminals 304) that alerts the users 106a-106c of the determined 406 formation.

In some embodiments, the robot coordination unit 316 may selectively adjust the formation of the guidance robots 102a-102c travelling along the common route 104a. For example, the formation of the guidance robots 102a-102c may be selectively adjusted when one of the guidance robots 102a-102c and the associated user 106a-106c arrives at a destination. In the exemplary embodiment, referring generally to FIGS. 6-9, the first guidance robot 102a guides the first user 106a towards a destination B, while the second and third guidance robots 102b and 102c guide the second and third users 106b and 106c towards the destination C. After the guidance robot 102a and the associated user 106a arrive at the destination B, the guidance robots 102b and 102c and the associated users 106b and 106c continue along the common route 104b towards the destination C. The robot coordination unit 316 may selectively adjust the formation of the guidance robots 102b and 102c along the common route 104b as fewer guidance robots and users are included in the group. For example, where the guidance robots 102a-102c are arranged in a line formation (shown in FIG. 7) while travelling along the common route 104a, after the guidance robot 102a arrives at the destination B, the guidance robots 102b and 102c may revert to a side-by-side formation (shown in FIG. 6), positioned in front of the associated users 106b and 106c. The side-by-side formation may be suitable along the common route 104b and less of a concern for creating disruptions within the environment 100 since two guidance robots occupy less space than three guidance robots.

The formation of the guidance robots 102a-102c may additionally and/or alternatively be selectively adjusted by the robot coordination unit 316 based on identified environmental parameters within the environment 100 and along the common route 104a. The environmental parameters may be identified by the environmental modeling unit, or may be identified in real-time based on the real-time sensor data received via the guidance robots 102a-102c. The identified environmental parameters may include, but are not limited to including, number of pedestrians (e.g., the pedestrian 112) located in a vicinity of the common route 104a, a width (measured in a direction perpendicular to the travel direction 108) of a travel surface (e.g., travel surface 114) of the common route 104a, and an obstruction (e.g., an obstruction 110) located along the common route 104a. The robot coordination unit 316 may selectively adjust the formation of the guidance robots 102a-102c to facilitate optimizing travel of the guidance robots 102a-102c and associated users 106a-106c while travelling along the common route 104a and minimizing disruption within the surrounding environment 100. For example, an identified environmental parameter may signal that relatively few obstructions 110 and/or pedestrians 112 are located within the environment 100 along a portion of the common route 104a. Additionally and/or alternatively, an identified environmental parameter may signal that the width of the travel surface 114 has increased. The robot coordination server 316 may selectively adjust the formation to enable the guidance robots 102a-102c and the associated users 106a-106c to occupy more space (e.g., in the formation of FIG. 6) along portions of the common route 104a where there are relatively few obstructions 110 and/or pedestrians 112, and/or where there is more room to occupy along the span of the travel surface 114, as there is a lower chance of the group of guidance robots 102a-102c and associated users 106a-106c creating disruptions within the environment 100. The robot coordination server 316 may also selectively adjust the formation to revert the guidance robots 102a-102c and the associated users 106a-106c to a formation that occupies less space (e.g., in the formation of FIGS. 7, 8, and/or 9) based on an identified environment parameter of a subsequent portion of the common route 104a. For example, over a subsequent portion of the common route 104a, an identified environmental parameter may signal the presence of an obstruction 110 along the common route 104, a greater number of pedestrians 112 within a vicinity of the common route 104a, and/or that a width of the travel surface 114 has narrowed, and the robot coordination server 316 selectively adjusts the formation of the guidance robots 102a-102c and the associated users 106a-106c accordingly.

Figure 10:
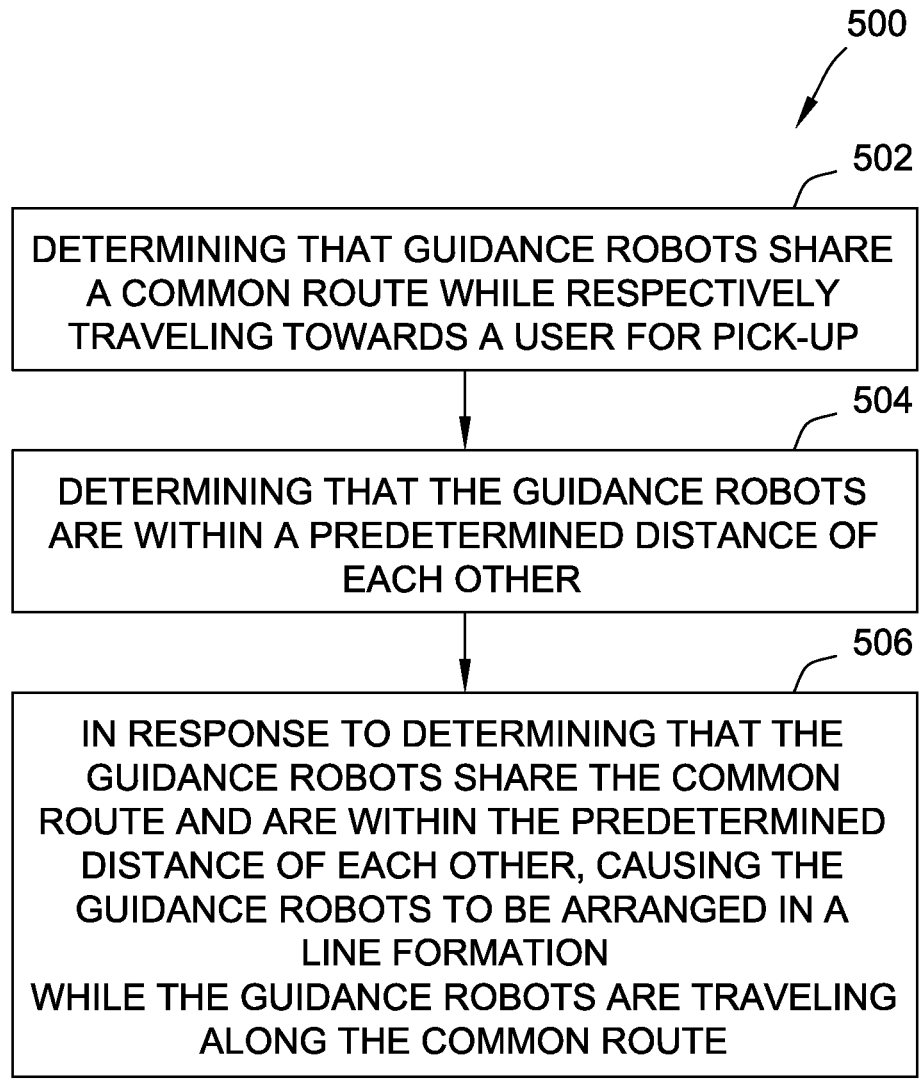
FIG. 10 shows an exemplary method for use in coordinating the travel of guidance robots that are each travelling towards an associated user.

Referring now to FIG. 10, an exemplary method 500 for coordinating the travel of guidance robots 102, while each guidance robot 102 is travelling towards an associated user 106 (e.g., to pick-up the associated user 106) is shown. In the exemplary embodiment, the method 500 is implemented by the GRC server 302, for example, via the robot coordination unit 316 using at least one processor executing instructions that are store in at least one memory in communication with the at least one processor. The exemplary method 500 may be used to coordinate the travel of guidance robots 102 that are travelling along the common route 104 within the environment 100 shown in FIG. 1.

The method 500 includes determining 502 that multiple (i.e., two or more) guidance robots 102 share a common route 104 that is traveled by each of the guidance robots 102 while respectively travelling towards an associated user 106, for example, to meet the associated user 106 at a pick-up location. In the exemplary embodiment, the robot coordination unit 316 may determine 502 that multiple guidance robots 102 share the common route 104 based on information received from the robot tracking unit 308 and the route determination unit 310. For example, the robot coordination unit 316 may receive information from the robot tracking unit 308 that identifies the guidance robots 102 within the environment 100 that are currently assigned to guide an associated user 106 towards a desired destination and have not yet picked-up the associated user 106. The robot coordination unit 316 may also receive information from the route determination unit 310 that is indicative of the pick-up location at which each of the guidance robots 102 will meet the associated user 106. The robot coordination unit 316 may parse the information received from the robot tracking unit 308 and the route determination unit 310 to determine 502 that at least two guidance robots 102 that are currently assigned to guide an associated user 106 towards the desired destination will share a common route 104 while respectively travelling to meet the associate users 106 at the pick-up location(s).

Figure 11:
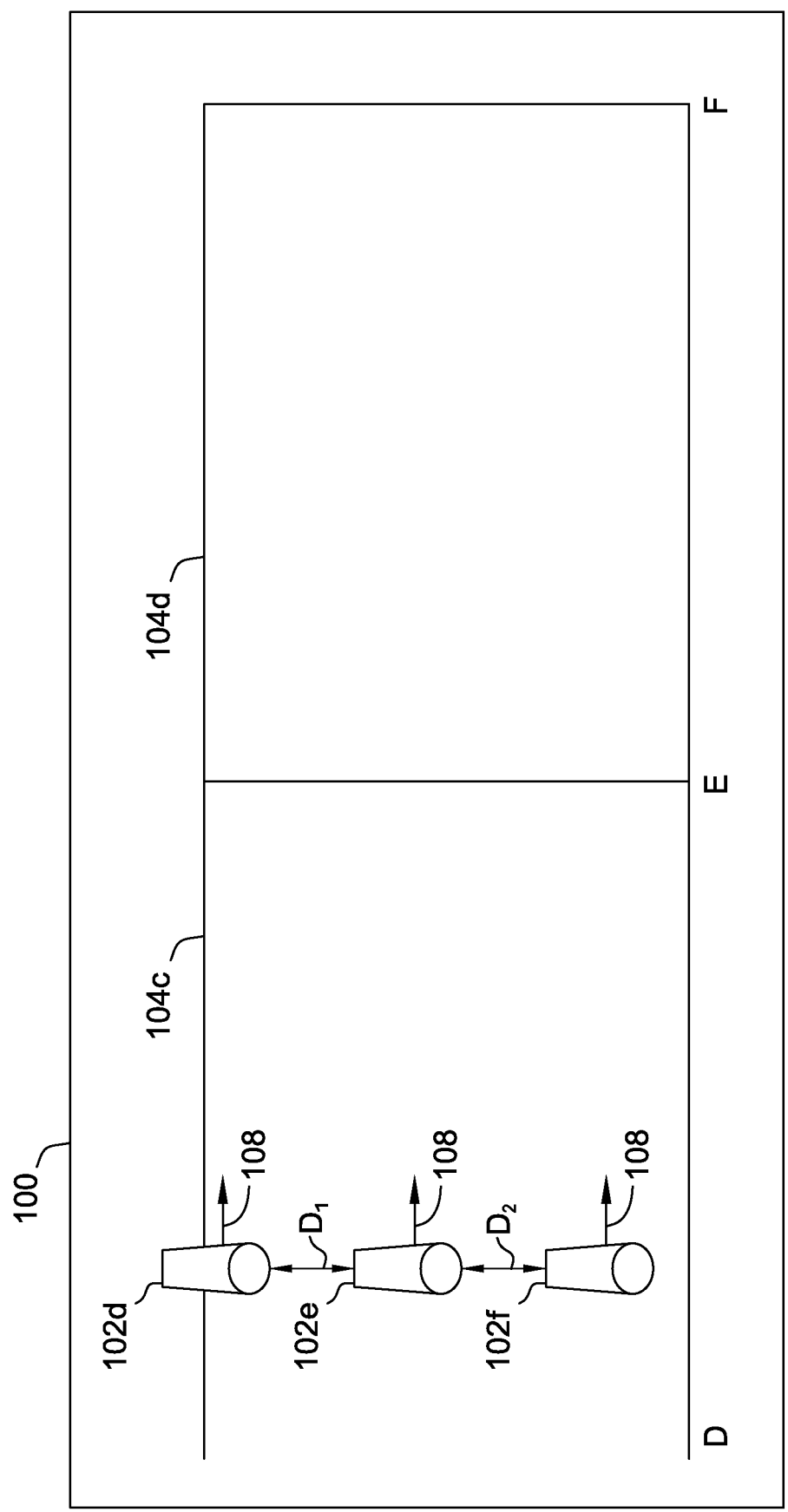
FIGS. 11 and 12 depict various formations in which guidance robots may be arranged in accordance with the method shown in FIG. 10.

To illustrate, reference is made to FIG. 11 which illustrates an example wherein the information received from the robot tracking unit 308 and the route determination unit 310 indicates that a first guidance robot 102d is travelling towards a pick-up location E, and that second and third guidance robots 102e and 102f are travelling towards a pick-up location F. The robot coordination unit 316 determines 502 that the guidance robots 102d-102f share a common route 104c in the travel direction 108 between a location D and the pick-up location E. The robot coordination unit 316 also determines 502 that the guidance robots 102e and 102f share a second common route 104d between the location E and the pick-up location F. The location D may be a destination at which each of the guidance robots 102d-f dropped off a previously associated user 106, or may be a location within the environment 100 at which the guidance robots 102d-f converge (e.g., are within a predetermined distance of each other).

Description of the exemplary method 500 will proceed with reference to the scenario shown in FIG. 11 (and FIG. 12 described further below) wherein three guidance robots 102d-102f are determined 502 to share a common route. In other embodiments, the number of guidance robots 102 that are determined 502 to share a common route may vary. For example, the robot coordination unit 316 may determine 502 that two guidance robots 102 share a common route while travelling towards associated users 106, that four guidance robots 102 share a common route while travelling towards associated users 106, that five guidance robots 102 share a common route while travelling towards associated users 106, and so on.

The exemplary method 500 also includes determining 504 that the guidance robots 102d-102f, which were determined 502 to share a common route, are also within a predetermined distance of each other. The determination 502 may be based on identifying, for each of the guidance robots 102d-102f, a distance from the closest of the other guidance robots 102d-102f. As shown in FIG. 11, at the location D, the guidance robots 102d and 102e are a distance $D_1$ from one another and the guidance robots 102e and 102f are a distance $D_2$ from one another. The distances $D_1$ and $D_2$ may be determined by the robot coordination unit 316 based on and/or received as sensor data (e.g., sensor data from the position sensor 228 of each guidance robot 102d-102f). The robot coordination unit 316 may compare the distances $D_1$ and $D_2$ to a predetermined distance to assess whether the guidance robots 102d-102f are in close enough proximity to each other to justify coordinating the travel of the guidance robots 102d-102f. If the distance $D_1$ and/or $D_2$ is not within the predetermined distance, this may indicate that coordinating the travel of the robots 102d-102f would interrupt pick-up times or otherwise create disruptions within the environment 100. In some instances, the robot coordination unit 316 may determine that one of the guidance robots 102d-102f is not within the predetermined distance from any of the other guidance robots 102d-102f, while two of the guidance robots 102d-102f are within a predetermined distance from one another. In those instances, the two guidance robots 102d-102f that are within the predetermined distance from one another may be coordinated along the common route 104c while the other guidance robot 102d-102f that is not within the predetermined distance from the any of the other guidance robots 102d-102f continues to move towards the respective pick-up location without being coordinated with the other guidance robots 102d-102f.

Figure 12:
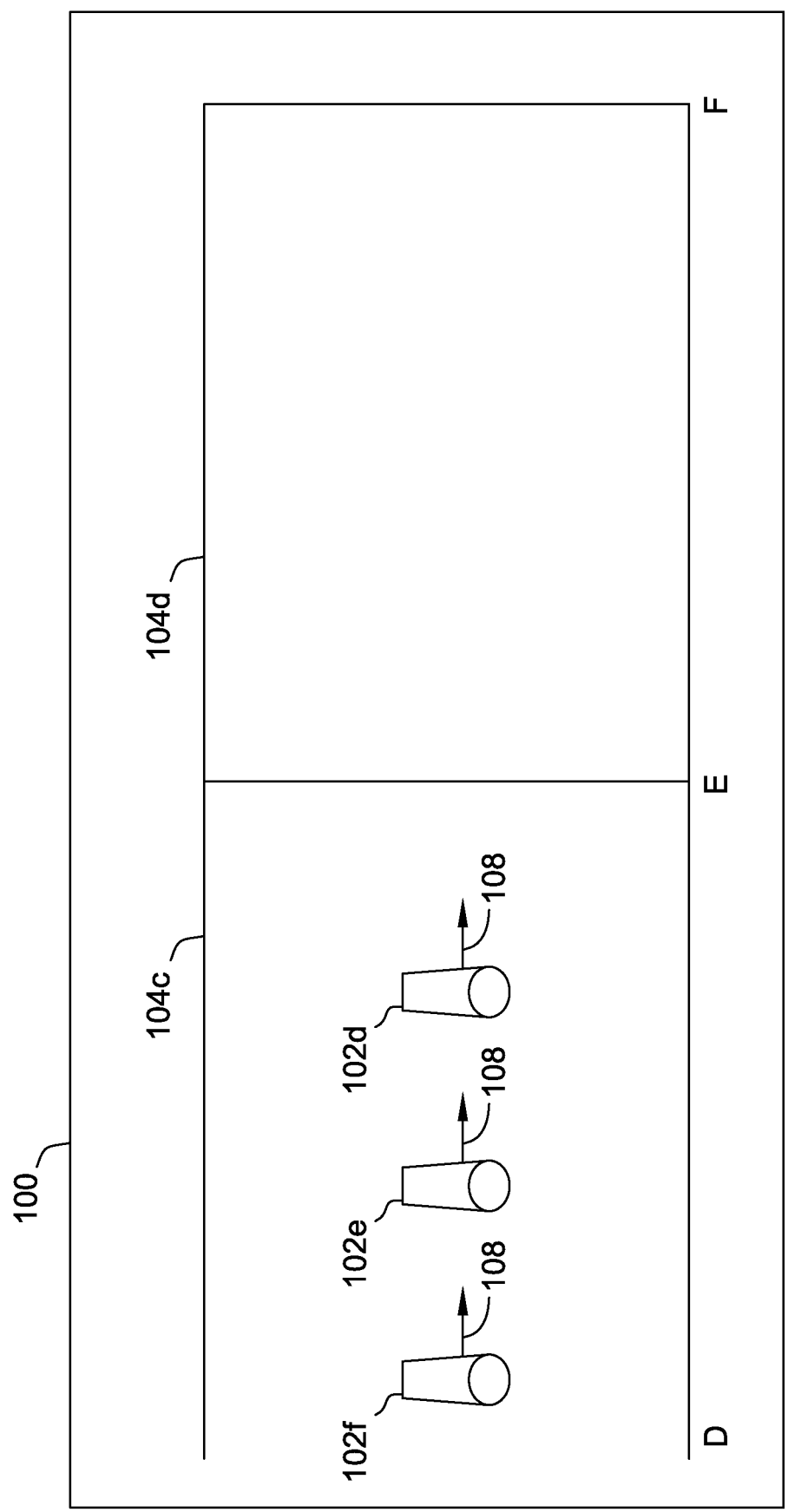

In the exemplary embodiment, the robot coordination unit 316 determines 504 that the guidance robots 102d-102f are within the predetermined distance from one another and share the common route 104c. In response, the robot coordination unit 316 causes 506 the guidance robots 102d-102f to be arranged in a suitable formation to facilitate optimizing the flow of the guidance robots 102d-102f while travelling along the common route 104c towards the respective pick-up locations E and F and minimizing disruptions within the environment 100. In the exemplary embodiment, as shown in FIG. 12, the robot coordination unit 316 causes 506 the guidance robots 102d-102f to be arranged in a line formation, extending substantially parallel to the travel direction 108. As described above for the method 400, the robot coordination unit 316 may selectively adjust the formation of the guidance robots 102d-102f as the guidance robots 102d-102f travel towards the respective pick-up locations E and F. For example, the formation of the guidance robots 102e and 102f may be selectively adjusted along the common route 104d after the guidance robot 102d arrives at the pick-up location E and exits the formation. Additionally and/or alternatively, the formation of the guidance robots 102d-102f may be selectively adjusted along the common route 104c and/or 104d based on one or more identified environmental parameters, as described above.

Figure 13:
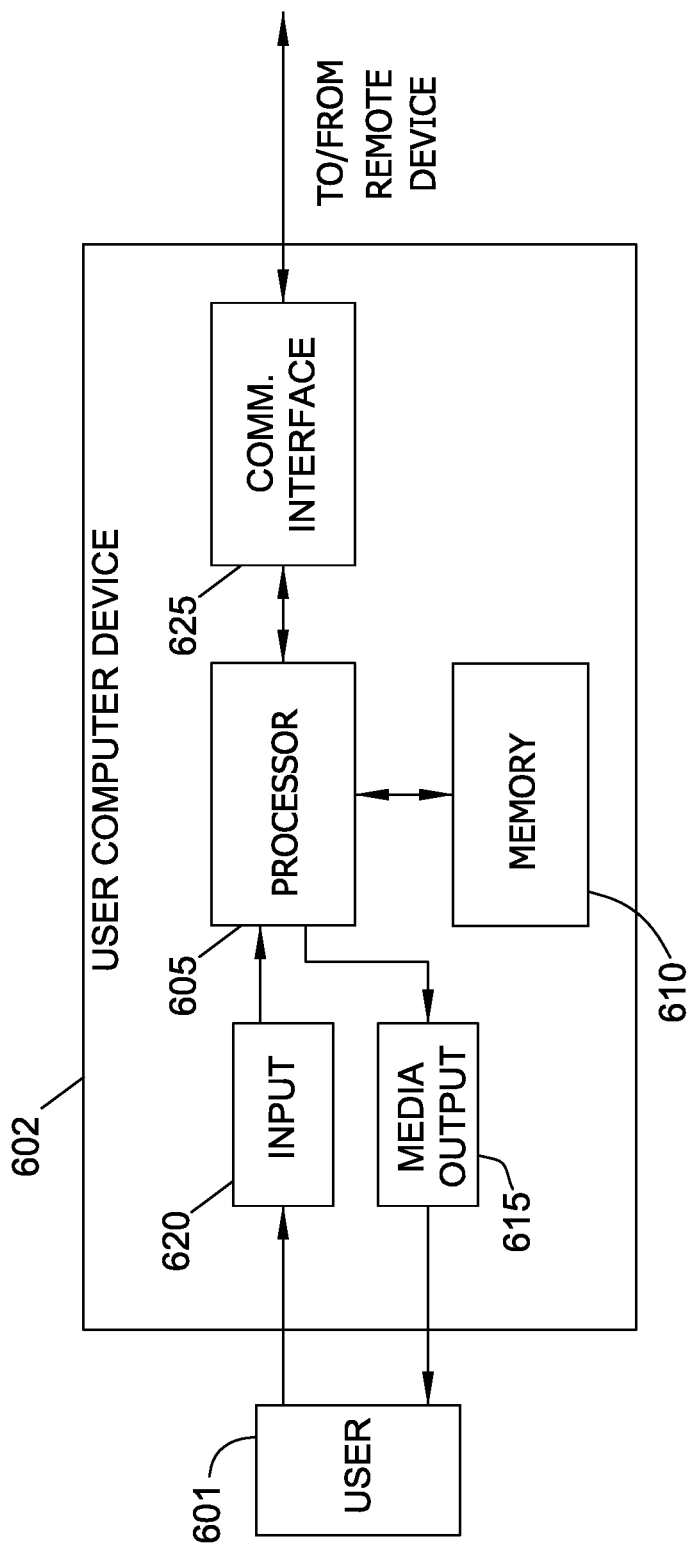
FIG. 13 illustrates an exemplary configuration of user computer device that may be implemented as one or more user terminals used in the system shown in FIG. 4.

FIG. 13 illustrates an exemplary configuration of user computer device 602 that may be implemented as one or more of the user terminals 304 used in the system 300 (shown in FIG. 4). User computer device 602 is operated by a user 601 (e.g., a user 106). The user computer device 602 includes a processor 605 for executing instructions. In some examples, executable instructions are stored in a memory area 610. The processor 605 can include one or more processing units (e.g., in a multi-core configuration). The memory area 610 is any device allowing information such as executable instructions and/or transaction data to be stored and retrieved. The memory area 610 can include one or more computer-readable media.

The user computer device 602 also includes at least one media output component 615 for presenting information to the user 601. The media output component 615 is any component capable of conveying information to the user 601. In some examples, the media output component 615 includes an output adapter (not shown) such as a video adapter and/or an audio adapter. An output adapter is operatively coupled to the processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 615 is configured to present an augmented reality overlay to the user 601. An augmented reality overlay can include, for example, an overlay that provides information about the objects that the user is currently viewing. In some examples, the user computer device 602 includes an input device 620 for receiving input from the user 601. The user 601 can use the input device 620 to, without limitation, input guidance requests for a guidance robot 102 and/or user information for use by the GRC server 302 and/or the guidance robots 102. The input device 620 can include, for example, a keyboard, a pointing device, a mouse, a stylus, a touch sensitive panel (e.g., a touch pad or a touch screen), a gyroscope, an accelerometer, a position detector, a biometric input device, one or more optical sensors, and/or an audio input device. A single component such as a touch screen can function as both an output device of the media output component 615 and the input device 620.

The user computer device 602 can also include a communication interface 625, communicatively coupled to a remote device such as the GRC server 302 and/or one or more guidance robots 102. The communication interface 625 can include, for example, a wired or wireless network adapter and/or a wireless data transceiver for use with a mobile telecommunications network.

Stored in the memory area 610 are, for example, computer-readable instructions for providing a user interface to the user 601 via the media output component 615 and, optionally, receiving and processing input from the input device 620. A user interface can include, among other possibilities, a web browser and/or a client application. Web browsers enable users, such as the user 601, to display and interact with media and other information typically embedded on a web page or a website from the GRC server 302. A client application allows the user 601 to interact with, for example, the GRC server 302 and/or the guidance robots 102. For example, instructions can be stored by a cloud service, and the output of the execution of the instructions sent to the media output component 615.

The processor 605 executes computer-executable instructions for implementing aspects of the disclosure, such as the method 400 (shown in FIG. 5) and/or the method 500 (shown in FIG. 10).

Figure 14:
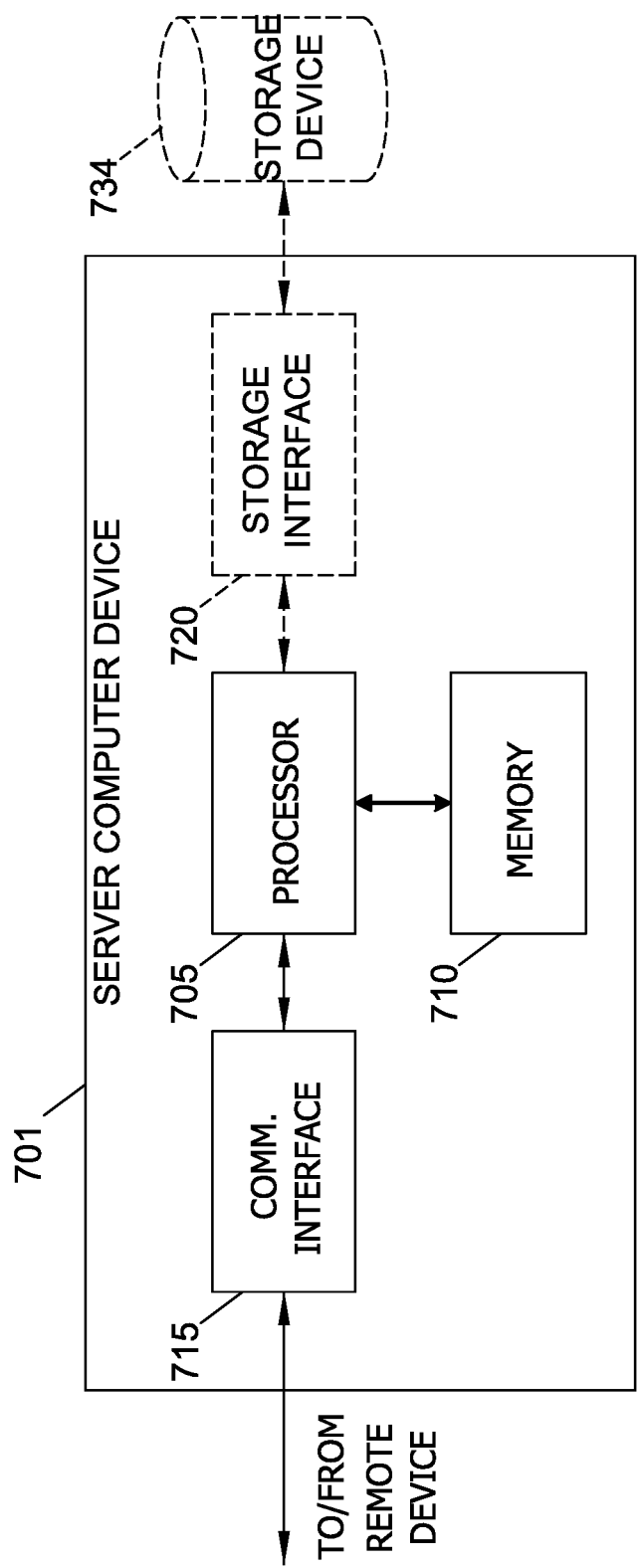
FIG. 14 illustrates an exemplary configuration of a server computer device that may be implemented as a guidance robot coordination server used in the system shown in FIG. 4.

FIG. 14 illustrates an exemplary configuration of a server computer device 701 that may be implemented as the GRC server 302 used in the system 300 (shown in FIG. 4). The server computer device 701 includes a processor 705 for executing instructions. Instructions can be stored in a memory area 710. The processor 705 can include one or more processing units (e.g., in a multi-core configuration).

The processor 705 is operatively coupled to a communication interface 715 such that the server computer device 701 is capable of communicating with a remote device such as another server computer device 701, another GRC server 302, one or more user terminals 304, and/or one or more guidance robots 102 (shown in FIG. 4). For example, the communication interface 715 can receive requests from a client system via the Internet.

The processor 705 can also be operatively coupled to a storage device 734. The storage device 734 is any computer-operated hardware suitable for storing and/or retrieving data, such as, but not limited to, data associated with the database 306 (shown in FIG. 4). In some examples, the storage device 734 is integrated in the server computer device 701. For example, the server computer device 701 can include one or more hard disk drives as the storage device 734. In other examples, the storage device 734 is external to the server computer device 701 and can be accessed by a plurality of server computer devices 701. For example, the storage device 734 can include a storage area network (SAN), a network attached storage (NAS) system, and/or multiple storage units such as hard disks and/or solid-state disks in a redundant array of inexpensive disks (RAID) configuration.

In some examples, the processor 705 is operatively coupled to the storage device 734 via a storage interface 720. The storage interface 720 is any component capable of providing the processor 705 with access to the storage device 734. The storage interface 720 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 705 with access to the storage device 734.

The processor 705 executes computer-executable instructions for implementing aspects of the disclosure. In some examples, the processor 705 is transformed into a special purpose microprocessor by executing computer-executable instructions or by otherwise being programmed. For example, the processor 705 is programmed with instructions that when executed cause the processor to perform the operations shown in FIGS. 5-12 and described above.

The methods and system described herein can be implemented using computer programming or engineering techniques including computer software, firmware, hardware, or any combination or subset. As disclosed above, there is a need for systems and methods that facilitate coordinating the travel of guidance robots occupying a common environment to harmonize flow of multiple guidance robots, minimize disruptions within the surrounding environment created by the guidance robots, and improve useability and enjoyment of the guidance robot functionality. The systems and methods described herein address by at least one of: (i) improving the flow of multiple guidance robots travelling along a common route; (ii) reducing the likelihood of disruptions created by multiple guidance robots travelling within the same common environment; (iii) facilitating greater flexibility in coordinating the travel of guidance robots travelling along a common route; (iv) enabling users to selectively travel in groups while being guided by guidance robots; (v) facilitating environmental awareness of coordinated guidance robots; (vi) enabling real-time adjustments of a formation in which coordinated guidance robots are arranged while travelling along a common route; (vii) facilitating reducing negative perception of guidance robots; and/or (viii) facilitating improving user enjoyment of and confidence in guidance robots.

The methods and systems described herein can be implemented using computer programming or engineering techniques including computer software, firmware, hardware, or any combination or subset thereof, wherein the technical effects can be achieved by performing at least one of the following steps: i) determining that at least a first guidance robot and a second guidance robot share a common route that is traveled by each of the first and second guidance robots while guiding a first user and a second user, respectively, towards a respective destination; ii) identifying a first user movement characteristic associated with the first user and a second user movement characteristic associated with the second user; iii) determining, based on the first and second user movement characteristics, a formation in which the first and second guidance robots are to be arranged while travelling along the common route; and/or iv) causing the first and second guidance robots to be arranged in the determined formation while travelling along the common route.

In still further embodiments, the technical effects may be achieved by performing at least one of the following steps: i) determining that at least a first guidance robot and a second guidance robot share a common route that is traveled by each of the first and second guidance robots while travelling towards a first user and a second user, respectively; ii) determining that the first guidance robot and the second guidance robot are within a predetermined distance of each other; and/or iii) in response to determining that the first and second guidance robots share the common route and are within the predetermined distance of each other, causing the first and second guidance robots to be arranged in a line formation while travelling along the common route.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the systems and methods described herein implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with different images and their corresponding classifications, generate a model which maps the image data to the classification data, and recognize future images and determine their corresponding categories.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential classifications.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for coordinating travel of guidance robots while each guidance robot is guiding an associated user towards a destination, said method implemented by a guidance robot coordination server including at least one processor and at least one memory in communication with the at least one processor, said method comprising:
   determining that at least a first guidance robot, a second guidance robot, and a third guidance robot share a common route that is traveled by each of the first, second, and third guidance robots while guiding a first user, a second user, and a third user, respectively, towards the respective destination;
   identifying a first user movement characteristic associated with the first user, a second user movement characteristic associated with the second user, and a third user movement characteristic associated with the third user;
   determining, based on the first, second, and third user movement characteristics, a formation in which the first, second, and third guidance robots are to be arranged while travelling along the common route, wherein the formation includes where the first and second guidance robots are positioned in front of the first, second, and third users and the third guidance robot is positioned behind the first, second, and third users; and
   causing the first, second, and third guidance robots to be arranged in the determined formation while travelling along the common route.

2. The method of claim 1, wherein the first and second user movement characteristics each include a travel speed associated with each of the first and second users.

3. The method of claim 2, wherein determining the formation in which the first and second guidance robots are to be arranged comprises determining that the first and second guidance robots should be arranged in a line formation while travelling along the common route, and determining the line formation based on the travel speed of each of the first and second users.

4. The method of claim 1, further comprising:
   identifying at least one environmental parameter associated with the common route; and
   determining, based on the first and second user movement characteristics and the at least one environmental parameter, a formation in which the first and second guidance robots are to be arranged while travelling along the common route.

5. The method of claim 4, wherein identifying at least one environmental parameter comprises identifying a number of pedestrians located in a vicinity of the common route, identifying an obstruction located along the common route, or identifying a width of a travel surface of the common route.

6. The method of claim 1, further comprising:
   determining that the first guidance robot, the second guidance robot, and a third guidance robot are within a predetermined distance of each other; and
   in response to determining that the first, second, and third guidance robots share the common route and are within the predetermined distance of each other, causing the first, second, and third guidance robots to be arranged in a formation while travelling along the common route.

7. The method of claim 1, wherein determining the formation in which the first, second, and third guidance robots are to be arranged comprises determining that the first, second, and third guidance robots should be arranged in a line formation while travelling along the common route, and determining the line formation based on the first, second, and third user movement characteristics.

8. The method of claim 1, further comprising:
receiving an input from at least one of the first, second, and third users indicative of a desire for the first, second, and third users to travel together in a group;
determining, in response to the input, the formation in which the first, second, and third guidance robots are to be arranged while travelling along the common route; and
causing the first, second, and third guidance robots to be arranged in the determined formation while travelling along the common route.

9. The method of claim 1, further comprising determining an alternative formation wherein, when the first, second, and third guidance robots are arranged in the alternative formation, each of the first, second, and third guidance robots are positioned in front of the first, second, and third users.

10. The method of claim 9, further comprising
selecting between the formation and the alternative formation.

11. The method of claim 10, wherein the selecting is based upon a user input.

12. The method of claim 10, wherein the selecting is based upon one or more environmental parameters.

13. The method of claim 1, further comprising:
determining that at least a first guidance robot and a second guidance robot share a common route that is traveled by each of the first and second guidance robots while travelling towards a first user and a second user, respectively;
determining that the first guidance robot and the second guidance robot are within a predetermined distance of each other; and
in response to determining that the first and second guidance robots share the common route and are within the predetermined distance of each other, causing the first and second guidance robots to be arranged in a line formation while travelling along the common route.

14. A system for coordinating travel of guidance robots, said system comprising:
at least a first guidance robot associated with a first user, a second guidance robot associated with a second user, and a third guidance robot associated with a third user, each of the first, second, and third guidance robots being assigned to guide the first, second, and third users, respectively, towards a respective destination; and
a guidance robot coordination server comprising at least one processor and at least one memory in communication with the at least one processor, the at least one memory storing instructions that, when executed by the at least one processor, cause the at least one processor to:
determine that the first guidance robot, the second guidance robot, and the third guidance robot share a common route that is traveled by each of the first, second, and third guidance robots while guiding the first, second, and third users, respectively, towards the respective destination;
identify a first user movement characteristic associated with the first user, a second user movement characteristic associated with the second user, and a third user movement characteristic associated with the third user;
determine, based on the first, second, and third user movement characteristics, a formation in which the first, second, and third guidance robots are to be arranged while travelling along the common route, wherein the formation includes where the first and second guidance robots are positioned in front of the first, second, and third users and the third guidance robot is positioned behind the first, second, and third users; and
cause the first, second, and third guidance robots to be arranged in the determined formation while travelling along the common route.

15. The system of claim 14, wherein the guidance robot coordination server comprises a remote central server communicatively coupled with at least each of the first and second guidance robots.

16. The system of claim 14, wherein the guidance robot coordination server is a decentralized server comprising at least a first computing device of the first guidance robot and a second computing device of the second guidance robot, the first and second computing devices being communicatively coupled and each comprising one of the at least one processor and one of the at least one memory.

17. The system of claim 14, wherein the instructions, when executed, further cause the at least one processor to determine the formation in which the first, second, and third guidance robots are to be arranged comprises by determining that the first, second, and third guidance robots should be arranged in a line formation while travelling along the common route, and determining the line formation based on the first, second, and third user movement characteristics.

18. The system of claim 14, wherein the instructions, when executed, further cause the at least one processor to:
determine that the first guidance robot, the second guidance robot, and a third guidance robot are within a predetermined distance of each other; and
in response to determining that the first, second, and third guidance robots share the common route and are within the predetermined distance of each other, cause the first, second, and third guidance robots to be arranged in a formation while travelling along the common route.

19. The system of claim 14, wherein the instructions, when executed, further cause the at least one processor to:
identify at least one environmental parameter associated with the common route; and
determine, based on the first and second user movement characteristics and the at least one environmental parameter, a formation in which the first and second guidance robots are to be arranged while travelling along the common route.

20. A computer device for coordinating travel of guidance robots, said computer device comprising at least one processor and at least one memory in communication with the at least one processor, the at least one memory storing instructions that, when executed by the at least one processor, cause the at least one processor to:
Cause at least a first guidance robot associated with a first user, a second guidance robot associated with a second user, and a third guidance robot associated with a third user, to guide the first, second, and third users, respectively, towards a respective destination; and act as a guidance robot coordination server configured to:

determine that the first guidance robot, the second guidance robot, and the third guidance robot share a common route that is traveled by each of the first, second, and third guidance robots while guiding the first, second, and third users, respectively, towards the respective destination;

identify a first user movement characteristic associated with the first user, a second user movement characteristic associated with the second user, and a third user movement characteristic associated with the third user;

determine, based on the first, second, and third user movement characteristics, a formation in which the first, second, and third guidance robots are to be arranged while travelling along the common route, wherein the formation includes where the first and second guidance robots are positioned in front of the first, second, and third users and the third guidance robot is positioned behind the first, second, and third users; and cause the first, second, and third guidance robots to be arranged in the determined formation while travelling along the common route.

* * * * *